US011182833B2

(12) United States Patent
Asthana et al.

(10) Patent No.: US 11,182,833 B2
(45) Date of Patent: Nov. 23, 2021

(54) ESTIMATING ANNUAL COST REDUCTION WHEN PRICING INFORMATION TECHNOLOGY (IT) SERVICE DEALS

(71) Applicant: International Business Machines Corporation, Armonk, NY (US)

(72) Inventors: Shubhi Asthana, San Jose, CA (US); Valeria Becker, Buenos Aires (AR); Kugamoorthy Gajananan, Tokyo (JP); Aly Megahed, San Jose, CA (US); Taiga Nakamura, Sunnyvale, CA (US); Mark A. Smith, Leichestershire (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/860,213

(22) Filed: Jan. 2, 2018

(65) Prior Publication Data
US 2019/0205953 A1  Jul. 4, 2019

(51) Int. Cl.
*G06Q 30/02*  (2012.01)
(52) U.S. Cl.
CPC ..... *G06Q 30/0283* (2013.01); *G06Q 30/0206* (2013.01)
(58) Field of Classification Search
CPC ............ G06Q 30/0283; G06Q 30/0206
See application file for complete search history.

(56) References Cited

U.S. PATENT DOCUMENTS 6,195,646 B1   2/2001 Grosh et al.
6,963,854 B1 * 11/2005 Boyd ............... G06Q 30/0283
                                                   705/1.1
7,010,494 B2   3/2006 Etzioni et al.
(Continued)

FOREIGN PATENT DOCUMENTS

WO   2012016439 A1   2/2012
WO   2014014470 A1   1/2014
WO   2014060226 A1   4/2014

OTHER PUBLICATIONS

Akkiraju, R., et al., "On Pricing Complex IT Service Solutions," Service Research and Innovation Institute Global 2014 Conference, 2014, pp. 55-64, IEEE, United States (Year: 2014).*
(Continued)

*Primary Examiner* — Rutao Wu
*Assistant Examiner* — Sarjit S Bains
(74) *Attorney, Agent, or Firm* — Sherman IP LLP; Kenneth L. Sherman; Steven Laut

(57) ABSTRACT

One embodiment provides a method for estimating unit price reduction of services in a new in-flight deal using data of historical deals and market reference deals cost structures. The method includes receiving a detailed cost structure for historical deals information, market deals information, services quantity information and deals metadata for a first year. For each service: peer deals to the in-flight deal are selected based on the detailed cost structure; missing cost data values in the peer deals are augmented; unit cost reduction values for the peer deals estimated; the unit cost reduction for the in-flight deal from each year in total contract years to a next year without a last contract year are estimated; and a total cost for the in-flight deal for all years in the total contract years beyond the first year are estimated.

17 Claims, 16 Drawing Sheets

(56) References Cited

U.S. PATENT DOCUMENTS

| | | | |
|---|---|---|---|
| 7,039,559 B2 | 5/2006 | Froehlich et al. | |
| 7,139,733 B2 | 11/2006 | Cao et al. | |
| 7,324,969 B2 | 1/2008 | Pallister et al. | |
| 7,571,120 B2 | 8/2009 | Fellenstein et al. | |
| 7,610,233 B1* | 10/2009 | Leong | G06Q 10/087 705/26.3 |
| 7,711,747 B2 | 5/2010 | Renders et al. | |
| 7,853,473 B2 | 12/2010 | Davis et al. | |
| 7,865,384 B2 | 1/2011 | Anderson et al. | |
| 7,870,047 B2 | 1/2011 | Mojsilovic et al. | |
| 7,877,293 B2 | 1/2011 | Biebesheimer et al. | |
| 7,937,304 B2 | 5/2011 | Melnicoff et al. | |
| 7,953,646 B2 | 5/2011 | Pallister et al. | |
| 7,971,180 B2 | 6/2011 | Kreamer et al. | |
| 8,055,530 B2 | 11/2011 | Cao et al. | |
| 8,352,355 B2 | 1/2013 | Ettl et al. | |
| 8,584,135 B2 | 11/2013 | Boss et al. | |
| 8,676,981 B2 | 3/2014 | Hackett et al. | |
| 8,781,989 B2 | 7/2014 | Duchon | |
| 8,892,625 B2 | 11/2014 | Liang et al. | |
| 9,041,797 B2 | 5/2015 | Shaffer et al. | |
| 9,124,601 B2 | 9/2015 | Stoica et al. | |
| 9,129,299 B1* | 9/2015 | Donohue | G06Q 10/06393 |
| 9,230,216 B2 | 1/2016 | Bart et al. | |
| 9,286,391 B1 | 3/2016 | Dkystra | |
| 9,418,339 B1 | 8/2016 | Leonard et al. | |
| 9,619,583 B2 | 4/2017 | Lau et al. | |
| 9,659,317 B2 | 5/2017 | Naghmouchi et al. | |
| 9,672,074 B2 | 6/2017 | Gaurav et al. | |
| 9,755,988 B2 | 9/2017 | Arnette et al. | |
| 9,779,407 B2 | 10/2017 | Adjaoute | |
| 10,095,990 B2 | 10/2018 | Farooq et al. | |
| 2003/0130861 A1 | 7/2003 | Seitz | |
| 2003/0220773 A1* | 11/2003 | Haas | G06Q 10/0637 703/2 |
| 2004/0167789 A1* | 8/2004 | Roberts | G06Q 10/06 705/400 |
| 2004/0267676 A1* | 12/2004 | Feng | G06Q 30/0283 705/400 |
| 2005/0071182 A1 | 3/2005 | Aikens et al. | |
| 2005/0131754 A1 | 6/2005 | Chapman et al. | |
| 2005/0189415 A1 | 9/2005 | Fano et al. | |
| 2005/0278202 A1 | 12/2005 | Broomhall et al. | |
| 2006/0089866 A1 | 4/2006 | Cheng et al. | |
| 2006/0111973 A1 | 5/2006 | Brown et al. | |
| 2006/0129879 A1 | 6/2006 | Alznauer et al. | |
| 2007/0143171 A1 | 6/2007 | Boyd et al. | |
| 2008/0167928 A1 | 7/2008 | Cao et al. | |
| 2009/0012800 A1 | 1/2009 | Devarakonda et al. | |
| 2009/0030829 A1 | 1/2009 | Chatter et al. | |
| 2009/0222297 A1* | 9/2009 | Cao | G06Q 10/0635 705/400 |
| 2009/0240517 A1 | 9/2009 | Pelter et al. | |
| 2010/0235294 A1 | 9/2010 | Raghupathy et al. | |
| 2010/0250296 A1 | 9/2010 | Channabasavaiah et al. | |
| 2010/0262509 A1 | 10/2010 | Delia et al. | |
| 2010/0262548 A1 | 10/2010 | Herbst et al. | |
| 2011/0004509 A1 | 1/2011 | Wu et al. | |
| 2011/0066466 A1 | 3/2011 | Narayanan | |
| 2011/0218865 A1 | 9/2011 | Muthukrishnan et al. | |
| 2011/0238477 A1 | 9/2011 | Urbankski | |
| 2012/0029974 A1* | 2/2012 | Councill | G06Q 30/0206 705/7.35 |
| 2012/0030199 A1 | 2/2012 | Mohajer | |
| 2012/0059680 A1 | 3/2012 | Guthrie et al. | |
| 2012/0059707 A1 | 3/2012 | Goenka et al. | |
| 2012/0072251 A1 | 3/2012 | Mircean et al. | |
| 2012/0232948 A1 | 9/2012 | Wolf et al. | |
| 2012/0290347 A1 | 11/2012 | Elazouni et al. | |
| 2012/0290500 A1* | 11/2012 | Ettl | G06Q 30/0283 705/36 R |
| 2012/0303491 A1 | 11/2012 | Hill et al. | |
| 2012/0317050 A1 | 12/2012 | Bermuth | |
| 2013/0054296 A1 | 2/2013 | Gajakosh et al. | |
| 2013/0166355 A1* | 6/2013 | Mohanty | G06Q 30/0283 705/7.35 |
| 2013/0197993 A1 | 8/2013 | Gao et al. | |
| 2013/0218625 A1 | 8/2013 | Duquette et al. | |
| 2013/0246213 A1 | 9/2013 | Lee et al. | |
| 2013/0275085 A1 | 10/2013 | Cheng et al. | |
| 2013/0275181 A1 | 10/2013 | Digioacchino et al. | |
| 2013/0297412 A1 | 11/2013 | Batra et al. | |
| 2013/0332243 A1 | 12/2013 | Gifford et al. | |
| 2013/0339089 A1* | 12/2013 | Olsen | G06Q 30/0202 705/7.31 |
| 2014/0006044 A1 | 1/2014 | Pradhan et al. | |
| 2014/0052492 A1 | 2/2014 | Boss et al. | |
| 2014/0096140 A1 | 4/2014 | Aquino et al. | |
| 2014/0096249 A1 | 4/2014 | Dupont et al. | |
| 2014/0114709 A1* | 4/2014 | Olsen | G06Q 40/12 705/7.12 |
| 2014/0200999 A1 | 7/2014 | Canny et al. | |
| 2014/0222473 A1 | 8/2014 | Patel et al. | |
| 2014/0278808 A1* | 9/2014 | Iyoob | G06Q 30/0206 705/7.35 |
| 2014/0310065 A1* | 10/2014 | Chowdhary | G06Q 30/0283 705/7.35 |
| 2015/0066598 A1 | 3/2015 | Branch et al. | |
| 2015/0100384 A1 | 4/2015 | Ettl et al. | |
| 2015/0193709 A1 | 7/2015 | Babu | |
| 2016/0140789 A1 | 5/2016 | Wichersham, III et al. | |
| 2016/0148227 A1 | 5/2016 | Choe et al. | |
| 2016/0203506 A1 | 7/2016 | Butler, IV et al. | |
| 2016/0321331 A1 | 11/2016 | Uchiumi et al. | |
| 2017/0004408 A1 | 1/2017 | Edelen et al. | |
| 2017/0103451 A1 | 4/2017 | Alipov et al. | |
| 2018/0144314 A1* | 5/2018 | Miller | G06Q 20/14 |
| 2019/0019148 A1* | 1/2019 | Kumar | G06Q 10/08345 |

OTHER PUBLICATIONS

Paul Bussey, Nathalie Cassaigne and Madan Singh, "Bid Pricing—Calculating the Possibility of Winning", IEEE 1997, pp. 3615-3620. (Year: 1997).*

Soni, Aishwarya; Hasan, Muzammil, "Pricing schemes in cloud computing: a review", International Journal of Advanced Computer Research; Bhopal vol. 7, Issue 29, (Mar. 2017): p. 60-70 (Year: 2017).*

Megahed et al., "Top-Down Pricing of IT Services Deals with Recommendation for Missing Values of Historical and Market Data", 14th International Conference, ICSOC 2016, Banff, AB, Canada, Oct. 10-13, 2016, Proceedings, p. 745-760 (Year: 2016).*

Akkiraju et al., "On Pricing Complex IT Service Solutions," IEEE, Service Research and Innovation Institute Global 2014 Conference, 2014, pp. 55-64 (Year: 2014).*

Akkiraju et al., "On the Role of Analytics in Estimating the Cost of Delivering Complex Information Technology (IT) Outsourcing Services Projects", 2012 Annual SRII Global Conference, pp. 705-714, Jul. 2012 (Year: 2012).*

Kansal et al., "Pricing Models in Cloud Computing", CS '14: Proceedings of the 2014 International Conference on Information and Communication Technology for Competitive Strategies, Oct. 2014, Article No. 33, pp. 1-5 (Year: 2014).*

Gajananan et al., "A Top-Down Pricing Algorithm for IT Service Contracts Using Lower Level Service Data", 2016 IEEE International Conference on Services Computing (SCC), 720-7; 679, Sep. 2016 (Year: 2016).*

A. Megahed, S. Asthana, V. Becker, T. Nakamura and K. Gajananan, "A Method for Selecting Peer Deals in IT Service Contracts," 2017 IEEE International Conference on AI & Mobile Services (AIMS), pp. 1-7. (Year: 2017).*

Anonymous, "Method for Cloud and Cloud-Service Selection", ip.com, May 13, 2011, pp. 1-8, United States.

IBM, "Auto-Configuring Clusters Through Presence Based Discovery," ip.com, Feb. 6, 2007, pp. 1-3, United States.

Megahed, A., et al., "Pricing IT Services Deals: A More Agile Top-Down Approach", In Proceedings of the 13th International

(56) References Cited

OTHER PUBLICATIONS

Conference on Service Oriented Computing (ICSOC), Nov. 2015, pp. 461-473, vol. 9435, Springer, Berlin, Heidelberg.
Megahed, A., et al., "Modeling Business Insights into Predictive Analytics for the Outcome of IT Service Contracts", In Proceedings of the 12th IEEE International Conference on Services Computing (SCC), Jun. 2015, pp. 515-521, IEEE, United States [Abstract Only].
Gajananan, K., et al., "A Top-Down Pricing Algorithm for IT Service Contracts Using Lower Level Service Data", In Proceedings of the 13th IEEE International Conference on Services Computing (SCC), Jun. 2016, pp. 720-727, IEEE, United States.
Megahed, A., et al., "Top-Down Pricing of IT Services Deals with Recommendation for Missing Values of Historical and Market Data", Submitted for Publication at the 14th International Conference on Service Oriented Computing (ICSOC), 2016, pp. 1-15, United States.
Gajananan, K., et al., "A Method for Estimating Annual Unit Cost Reduction of IT Service Deals", Submitted for Publication at the 50th Hawaii International Conference on System Sciences (HICCS), 2017, pp. 1-9, United States.
Greenia, D., et al., "A win prediction model for IT outsourcing bids", In Proceedings of the IEEE Service Research and Innovation Institute (SRII), Apr. 2014, pp. 39-42, IEEE, United States.
Gaivoronski, A.A., et al., "Risk-Balanced Dimensioning and Pricing of End-to-End Differentiated Services," European Journal of Operational Research, 2016, pp. 644-655, vol. 254, No. 2, Elsevier B.V., Netherlands.
Rai, V.K., et al., "A Systemic and Relational Approach to Pricing Services," Service Science, Mar. 2016, pp. 37-58, vol. 8, No. 1, Institute for Operations Research and the Management Sciences (INFORMS), Maryland, United States.
Agarwal, D., et al., "fLDA: Matrix Factorization through Latent Dirichlet Allocation," WSDM, Jan. 2010, pp. 91-100, Research Gate, United States.
Business Wire, "DataDirect Technologies Helps Subaru Reduce IT Support Costs and Improve Customer Service," Nov. 2001, pp. 1-2, Rockville, United States.
PR Newswire, "EDS Signs Contract With United Airlines to Upgrade Computer Systems and Service to Reduce IT Costs," Jan. 17, 2006, pp. 1-2, Electronic Data Systems Corporation, United States.
Akkiraju, R., et al. "On Pricing Complex IT Service Solutions," Service Research and Innovation Institute Global Conference, 2014, pp. 55-64, IEEE, United States.
Mell, P., et al., "The NIST Definition of Cloud Computing", National Institute of Standards and Technology Special Publication 800-145, Sep. 2011, pp. 1-7, U.S. Department of Commerce, United States.
Anonymous, "Method and System for Providing a Proactive Backup for Value-Added Information Technology (IT) Service Delivery Requirements", Dec. 2, 2014, pp. 1-5, IP.com, United States.
Anonymous, "Methods and Systems for Adaptive Management and Dynamic Pricing of Information Technology Services", Feb. 25, 2013, pp. 1-4, IP.com, United States.
Anonymous, "Dynamic pricing of web services", Jun. 18, 2012, pp. 1-4, IP.com, United States.
Suri, P.K. et al., "Estimating the Probability of Project Completion by SIM_DEL Estimator", Proceedings of the International Journal of Computer Science and Information Technologies (IJCSIT), Aug. 2012, pp. 4938-4945, vol. 3 (4), ISSN: 0975-9646, United States.
Carman, S. et al., "Predictive Value of Comments in the Service Engagement Process", Proceedings of the American Society for Information Science and Technology (ASIST), 2012, pp. 1-12, vol. 49, United States.
Motahari Nezhad, H.R. et al., "Health identification and outcome prediction for outsourcing services based on textual comments", Proceedings of 2014 IEEE International Conference on Services Computing (SCC), Jun. 27, 2014-Jul. 2, 2014, pp. 155-162, IEEE, United States.
Yan, J. et al., "On Machine Learning towards Predictive Sales Pipeline Analytics", Proceedings of the 29th AAAI Conference on Artificial Intelligence, 2015, pp. 1945-1951, United States.
Lee, H. et al., "Enterprise Architecture Content Model Applied to Complexity Management while Delivering IT Services", Proceedings of the 2014 IEEE International Conference on Services Computing (SCC), Jun. 27, 2014-Jul. 2, 2014, pp. 408-415, IEEE, United States.
List of IBM Patents or Patent Applications Treated as Related Form.
List of IBM Patents or Patent Applications Treated as Related Form; Firth, M.K., U.S. Appl. No. 16/224,595, filed Dec. 18, 2018.
Lakoff, G., et al. "Metaphors We Live By," 1980, pp. ix-55, University of Chicago Press, Chicago, United States.
Edelman, S., "Computing the Mind," 2008, pp. xi-36, Oxford University Press, New York, United States.
Murphy, K.P., "Machine Learning, A Probabilistic Perspective," 2012, pp. 947-956, MIT Press, United States [Abstract Only].
Goffman, E., "Frame Analysis: An Essay on the Organization of Experience," 1974, pp. 1-39, 301-344, Northeastern University Press, United States [Abstract Only].
EIC 3600 Search Report dated Jul. 16, 2018 for U.S. Appl. No. 15/192,892 from Scientific and Technical Information Center, pp. 1-21, United States.
EIC 3600 Search Report dated Jul. 24, 2018 for U.S. Appl. No. 15/192,892 from Scientific and Technical Information Center, pp. 1-10, United States.
Van Dam, K.H. et al., eds. "Agent-based modelling of socio-technical systems", Science & Business Media, Oct. 8, 2012, vol. 9, Springer.
Grier, D.A., "When computers were human", Princeton University Press, Nov. 1, 2013.
Hayles, N.K., "My mother was a computer: Digital subjects and literary texts" University of Chicago Press, Mar. 15, 2010.
Treffert, D.A. ei al., "Islands of genius". Scientific American, vol. 286, No. 6, pp. 76-85, Jun. 1, 2002.
Mindell, D.A. et al., "Our robots, ourselves: Robotics and the muths of autonomy", Viking Adult, 2015.
Bardsiri, V.K. et al., "Increasing the accuracy of software development effort estimation using projects clustering", IET softward, vol. 6, No. 6, Dec. 1, 2012, pp. 461-473.
EIC 3600 Search Report dated Mar. 31, 2020 for U.S. Appl. No. 16/224,595 from Scientific and Technical Information Center, pp. 1-38, United States.
List of IBM Patents or Patent Applications Treated as Related Form; Fukuda, M. U.S. Appl. No. 15/192,875, filed Jun. 24, 2016; Firth, M.K., U.S. Appl. No. 15/192,892, filed: Jun. 24, 2016; Firth, M.K., U.S. Appl. No. 16/224,595, filed: Dec. 18, 2018; Megahed, A., U.S. Appl. No. 14/960,242, filed: Dec. 4, 2015; Fukuda, M.A., U.S. Appl. No. 17/153,076, filed: Jan. 20, 2021 (Cont. Below).
(Cont. Above) List of IBM Patents or Patent Applications Treated as Related Form; Fukuda, M., U.S. Appl. No. 15/192,884, filed Jun. 24, 2016; Asthana, S., U.S. Appl. No. 15/860,192, filed: Jan. 2, 2018, Fukuda, M., U.S. Appl. No. 14/977,383, filed: Dec. 21, 2015.
Ming, W. et al., "Dynamic Instance Provisioning Strategy in an Iaas Cloud", Proceedings of the 32nd Chinese Contol Conference, Jul. 26-28, 2013, pp. 6670-6675, IEEE.
Malensek, M. et al., "Using Distributed Analytics to Enable Real-Time Exploration of Discrete Event Simulations", IEEE/ACM 7th International Conference on Utility and Cloud Computing, 2014, vol. 4, pp. 49-58, IEEE, United Kingdom.

* cited by examiner

ESTIMATING ANNUAL COST REDUCTION WHEN PRICING INFORMATION TECHNOLOGY (IT) SERVICE DEALS

BACKGROUND

A service deal is a solution provided by a service provider based on client needs for delivery of services. Once a client agrees on a service deal, an arrangement/contract results between the two parties. Examples of service contracts include, but are not limited to, Information Technology (IT) services contracts, medical services contracts, financial services outsourcing contracts, and any other kind of service contracts that go through a tendering process. A tendering process involves multiple service providers preparing solutions for a service deal and competing with one another to win the deal. Each solution is a customized proposal including pricing of particular services of the deal. Each competing service provider submits a solution to the client for review.

The types of services included in a service deal may include complex, high-valued services that are difficult to price. For example, high-valued services included in an IT service contract may include, but are not limited to, Cloud, Mobility, Intel, Unix, Mainframe, Network Services, and service delivery management and governance.

SUMMARY

One or more embodiments relate to estimating unit price reduction of services in a new in-flight deal using data of historical deals and market reference deals cost structures. In one embodiment, a method includes receiving a detailed cost structure for historical information, market deals information, services quantity information and deals metadata for a first year. For each service: peer deals to the in-flight deal are selected based on the detailed cost structure; missing cost data values in the peer deals are augmented; unit cost reduction values for the peer deals estimated; the unit cost reduction for the in-flight deal from each year in total contract years to a next year without a last contract year are estimated; and a total cost for the in-flight deal for all years in the total contract years beyond the first year are estimated.

These and other aspects, features and advantages of the embodiments will be understood with reference to the drawing figures, and detailed description herein, and will be realized by means of the various elements and combinations particularly pointed out in the appended claims. It is to be understood that both the foregoing general description and the following brief description of the drawings and detailed description of the embodiments are exemplary and explanatory of preferred embodiments, and are not restrictive of the embodiments, as claimed.

BRIEF DESCRIPTION OF THE DRAWINGS

The subject matter which is regarded as the one or more embodiments is particularly pointed out and distinctly claimed in the claims at the conclusion of the specification. The foregoing and other objects, features, and advantages of the embodiments are apparent from the following detailed description taken in conjunction with the accompanying drawings in which:

Figure 1:
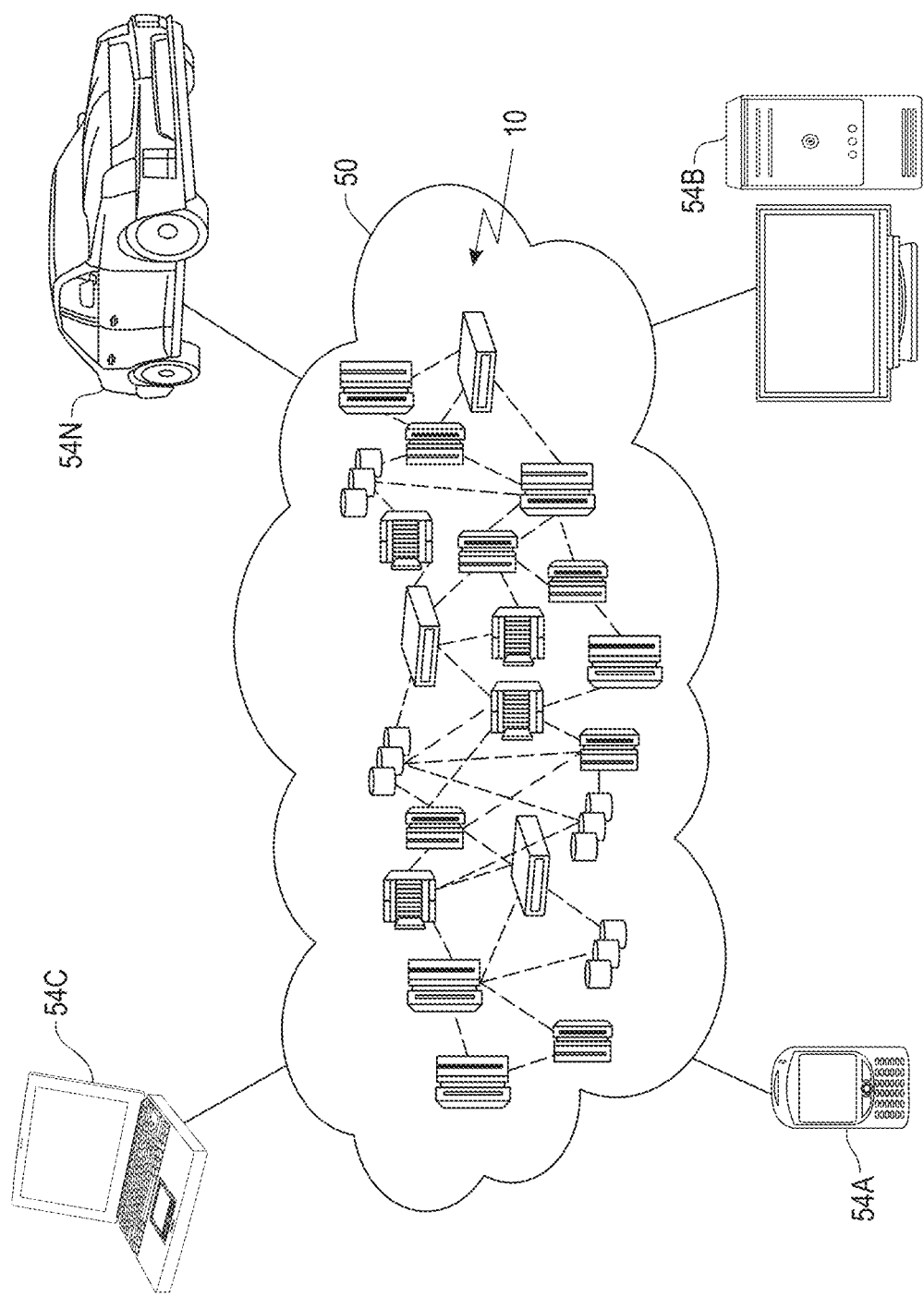
FIG. 1 depicts a cloud computing environment, according to an embodiment.

The detailed description explains the preferred embodiments, together with advantages and features, by way of example with reference to the drawings.

DETAILED DESCRIPTION

One or more embodiments relate to estimating unit price reduction of services in a new in-flight deal using data of historical deals and market reference deals cost structures. IT services typically have a hierarchical structure with different levels. That is, the top level of each service, level 1 (or first level), is further decomposed to sub-services at level 2 (or second level), and so on. An example is end users which is a level 1 service that is further composed of level 2 sub-services of end user security, end user emails, . . . etc. It should be noted that services typically have no more than 3 or 4 levels. Typically, in top-down pricing, it does not make sense to proceed beyond level 2 because the details beyond level 2 are not known in the deal early on for top-down pricing.

In one embodiment, a method includes receiving a detailed cost structure for historical information, market deals information, services quantity information and deals metadata for a first year. For each service: peer deals to the in-flight deal are selected based on the detailed cost structure; missing cost data values in the peer deals are augmented; unit cost reduction values for the peer deals estimated; the unit cost reduction for the in-flight deal from each year in total contract years to a next year without a last contract year are estimated; and a total cost for the in-flight deal for all years in the total contract years beyond the first year are estimated.

In this specification, the term "in-flight deal" is used to generally refer to a complex service deal either to be priced (i.e., to estimate its total cost and target price) or to assess probability of winning for different price points. The terms "in-flight deal", "scenario", "deal to be priced", and "service delivery contract" may be used interchangeably in this specification. The term "solution designer" is used to generally refer to an individual or a group of individuals tasked with preparing a solution for a service deal.

In this specification, the term "historical deal" is used to generally refer to a service deal that has occurred in the past and includes historical rates. The term "market deal" is used to generally refer to a service deal that is current and includes current market rates. The term "peer deal" is used to generally refer to a service deal for use as a reference for an in-flight deal. A peer deal may be a historical deal or a market deal. A peer deal includes one or more services of an in-flight deal to be priced. A solution designer may assess competitiveness of a solution by comparing the solution against historical and/or market deals.

In this specification, the terms "win", "won", or "winning" are used to generally refer to a successful outcome in relation to a service deal (e.g., a service provider bidding on the deal wins the deal). The terms "lose", "lost", or "losing" are used to generally refer to an unsuccessful outcome in relation to a service deal (e.g., a service provider bidding on the deal loses the deal because a competing service provider won the deal, the service provider stopped bidding on the deal, or a client decided not to pursue the deal). The term "deal outcome" is used to generally refer to whether a service deal is won (i.e., a successful outcome) or lost (i.e., an unsuccessful outcome).

In this specification, the term "contract year" is used to generally refer to a calendar year during which delivery of services of a service deal to a client begins/starts. The term "geography" is used to generally refer to a geographical location of a client. The term "industry" is used to generally refer to an industry of a client. Examples of an industry of a client includes, but is not limited to, banking, insurance, automotive, etc.

In this specification, the term "price point" is used to generally refer to a potential bidding price for an in-flight deal. A price point is a significant factor that affects chances of winning a deal.

A complex service deal typically includes a hierarchy of services ("service hierarchy") comprising multiple levels of service ("service levels"). A highest/first service level in a service hierarchy is decomposable into one or more lower/additional service levels. For example, end user is a highest/first service level that is decomposable into lower/additional service levels, such as hardware for end users, end user refresh, etc. A lower/additional service level itself may be further decomposable. In one example for a first level service is databases, where its second level sub-services are objects such as MySql, Oracle, DB2, . . . etc, which are types of databases.

It is understood in advance that although this disclosure includes a detailed description of cloud computing, implementation of the teachings recited herein are not limited to a cloud computing environment. Rather, the embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 2:
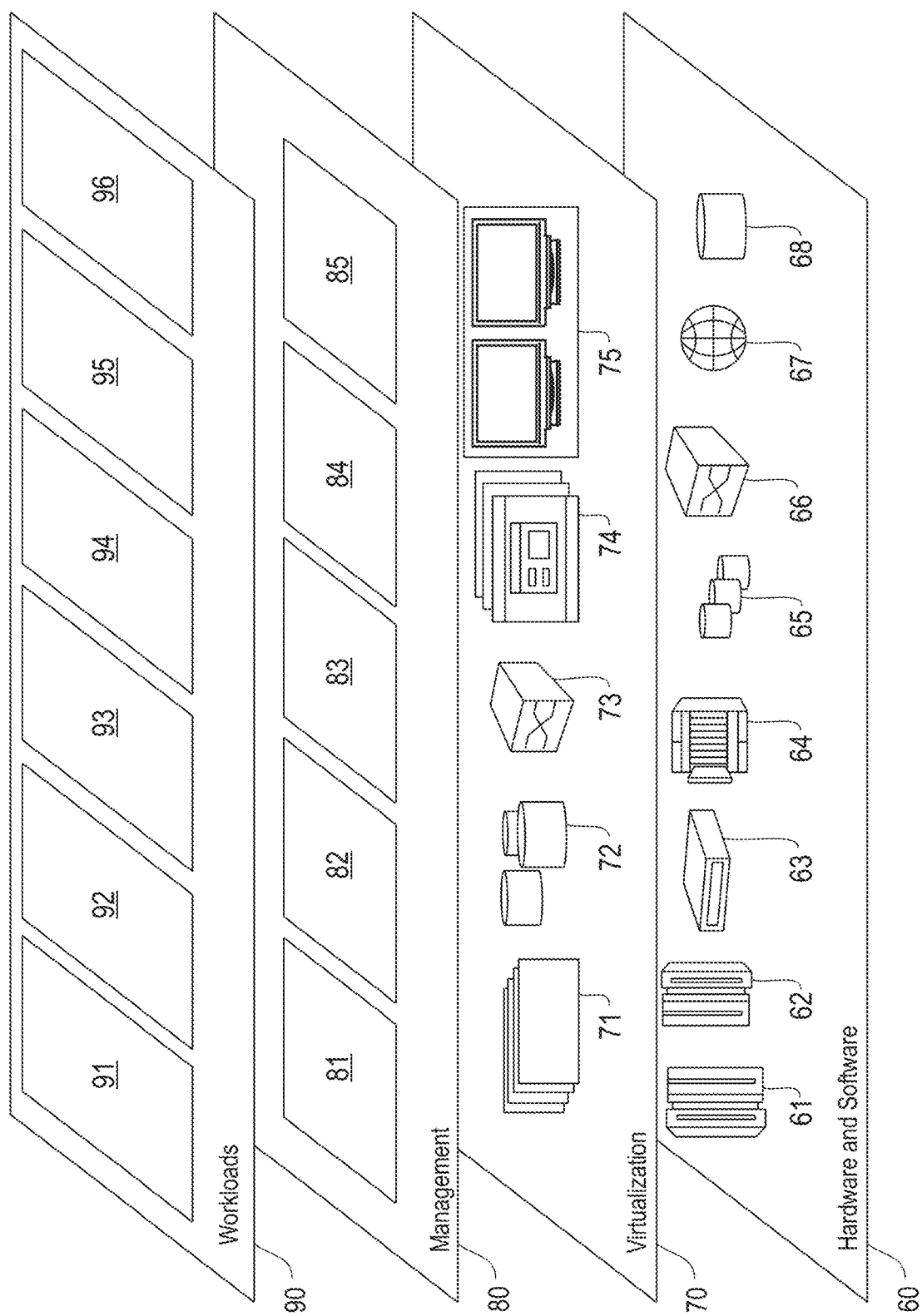
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and the embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generation of top down information of IT service deals using lower level data processing 96. As mentioned above, all of the foregoing examples described with respect to FIG. 2 are illustrative only, and the embodiments are not limited to these examples.

It is understood all functions of one or more embodiments as described herein may be typically performed by the network architecture 300 (FIG. 3), hardware system 400 (FIG. 4), system 500 (FIGS. 5, 6, 7, 9 and 10, which can be tangibly embodied as hardware processors and with components for storing program code. However, this need not be the case for non-real-time processing. Rather, for non-real-time processing the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments may be implemented with any type of clustered computing environment now known or later developed.

Figure 3:
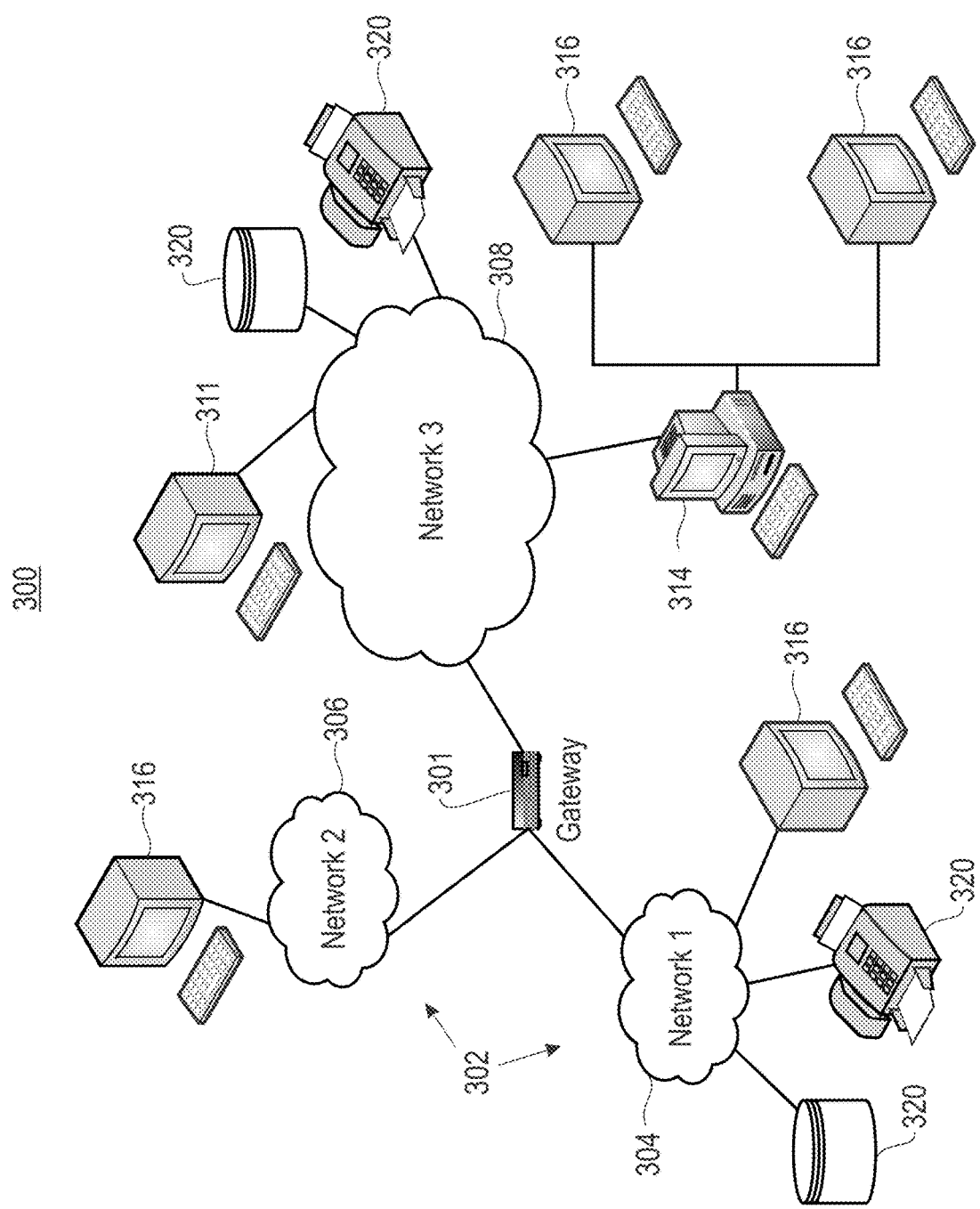
FIG. 3 is a network architecture for efficient representation, access and modification of variable length data objects, according to an embodiment.

FIG. 3 illustrates a network architecture 300, in accordance with one embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 311 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 4:
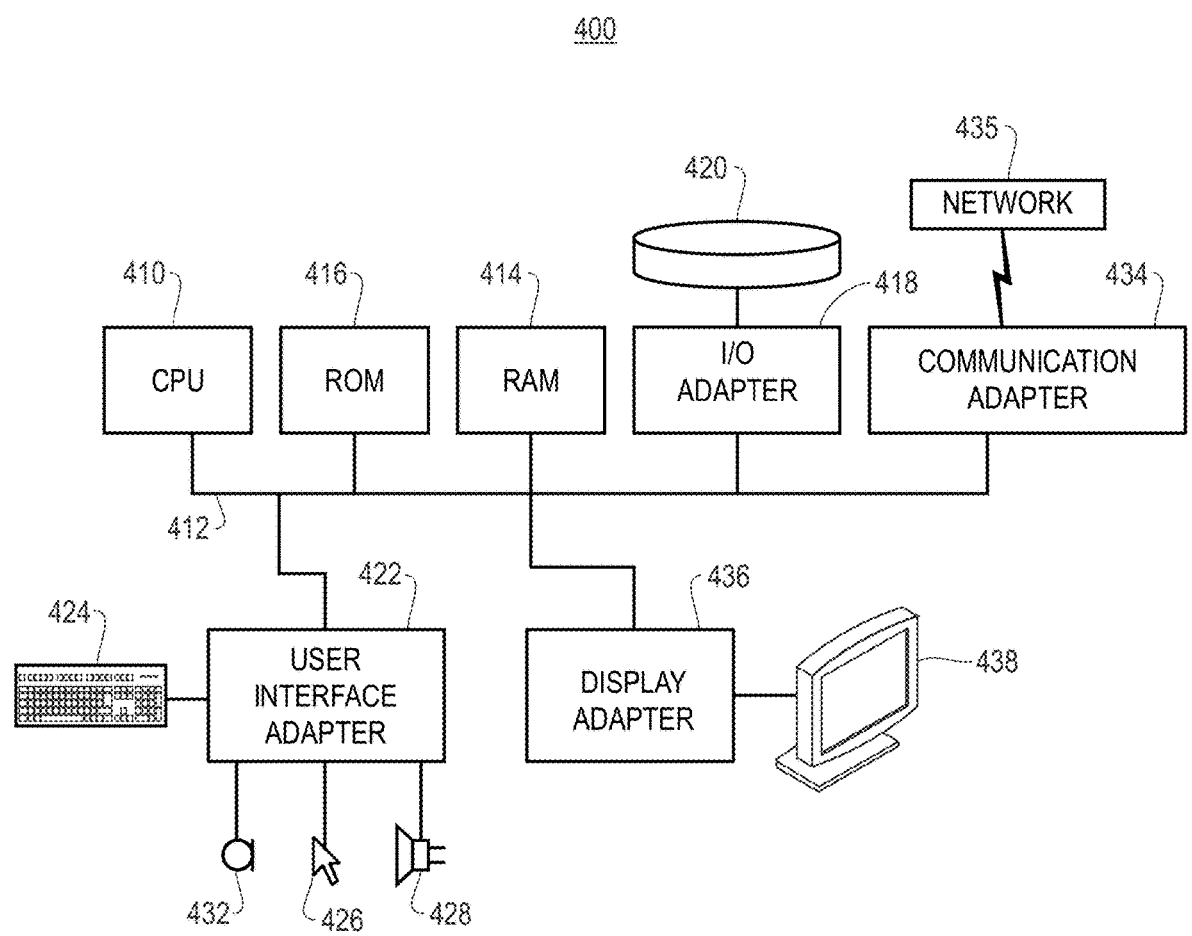
FIG. 4 shows a representative hardware environment that may be associated with the servers and/or clients of FIG. 1, according to an embodiment.

FIG. 4 shows a representative hardware system 400 environment associated with a user device 416 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 5:
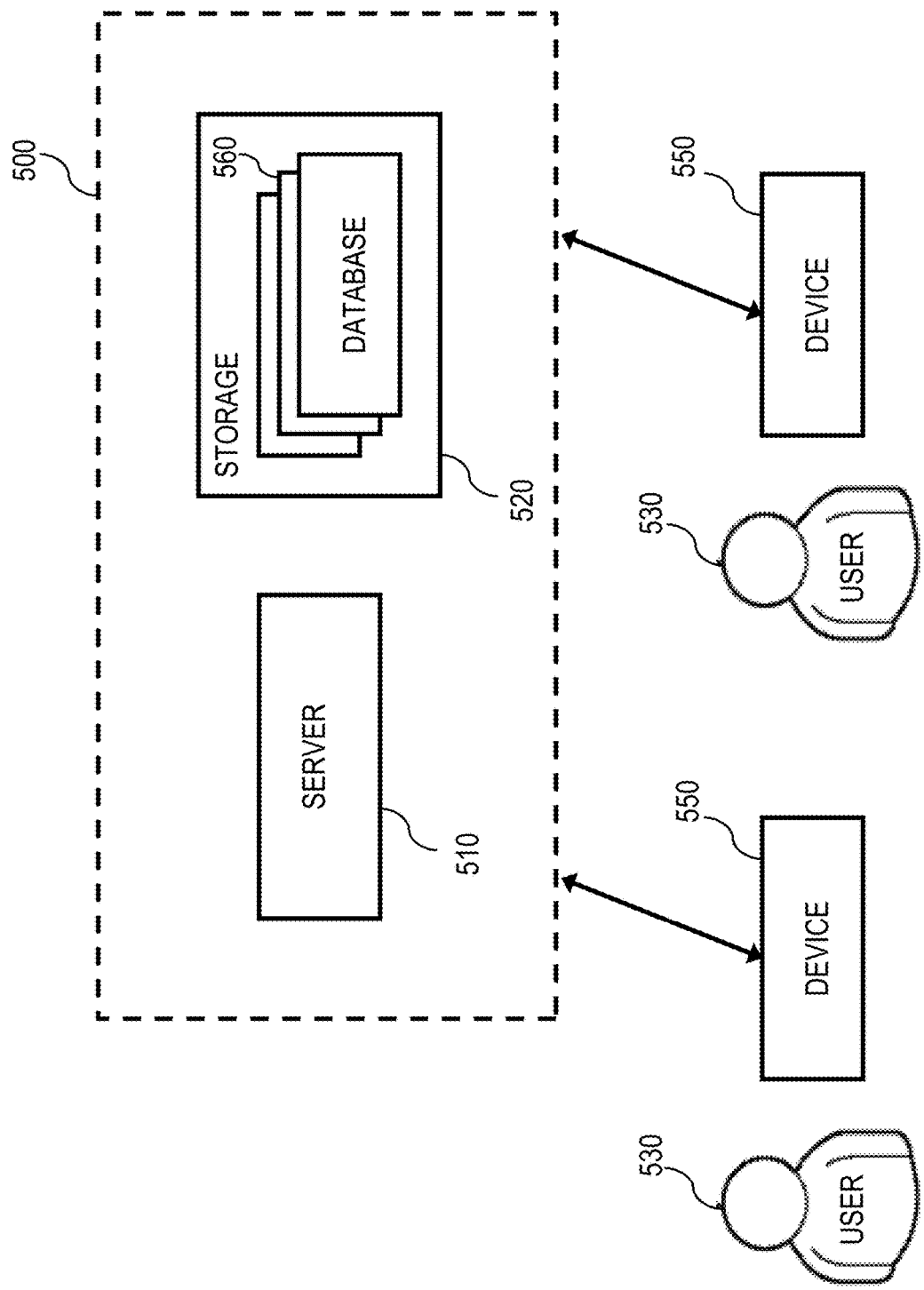
FIG. 5 illustrates an example system for deal analysis, in accordance with an embodiment.

FIG. 5 illustrates an example system 500 for deal analysis, in accordance with an embodiment. The system 500 comprises one or more server devices 510, and one or more storage devices 520. The storage devices 520 maintain one or more databases 560. As described in detail later herein, one or more application units may execute/operate on the server devices 510 to provide one or more tools to facilitate deal analysis. For example, in one embodiment, the system 500 provides a tool for augmenting missing values in historical and/or market data for deals. As another example, in one embodiment, the system 500 provides a tool for estimating costs and prices of an in-flight deal based on information relating to peer deals (i.e., historical or market deals) extend the top-down pricing algorithm to consider the next level of services hierarchy. Herein, the highest level of the hierarchy is denoted by level-one, and the level below is denoted by level-two. As yet another example, in one embodiment, the system 500 provides a tool for determining a set of peer deals (out of the historical or market deals) for each service included in the in-flight deal. These sets can then be used to have their costs mined in order to determine the estimated costs for the services of the in-flight deal. Still in another example, in one embodiment, the system 500 provides Unit cost/price reduction rates for each service included in the in-flight deal for the rest of the contract years after year one. The system 500 may provide a combination of one or more tools listed above.

A user 530 (e.g., a solution designer, a service provider, etc.) may access the system 500 using an electronic device 550, such as a personal computer, or a mobile device (e.g., a laptop computer, a tablet, a mobile phone, etc.). In one embodiment, each device 550 exchanges data with the system 500 over a connection (e.g., a wireless connection, a wired connection, or a combination of the two).

Figure 6:
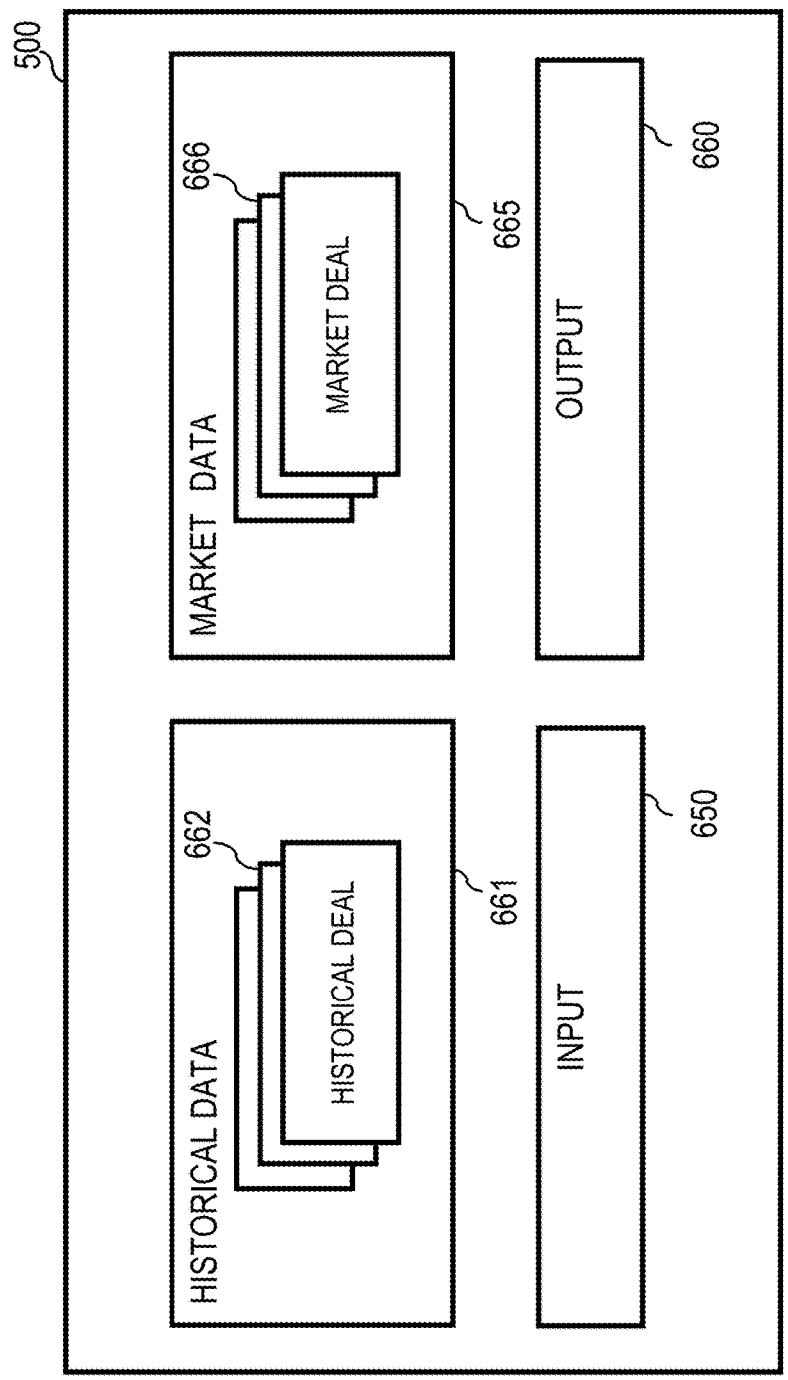
FIG. 6 illustrates the system in detail, in accordance with an embodiment.

FIG. 6 illustrates the system 500 in further detail, in accordance with an embodiment. The system 500 comprises an input interface 650 configured to receive, as input, at least one of the following: (1) information relating to a set of deals (i.e., historical or market deals), and (2) one or more user-specified input parameters.

In one embodiment, the information relating to the set of deals comprises, but is not limited to, the following: cost data structure for each service level in a service hierarchy of each deal (e.g., actual/observed cost data for each service included in the deal), and (2) metadata for each deal. In one embodiment, a cost data structure 801 (FIG. 8) comprises a matrix of cost values ("cost matrix").

Metadata for a deal includes, but is not limited to, at least one or more of following types of metadata: type of client, deal outcome, contract year, geography, and industry.

In one embodiment, the information relating to the set of deals is maintained on at least one database 560 (FIG. 5) of the storage devices 520 (FIG. 5). For example, in one embodiment, the storage devices 520 maintains at least one collection 661 of historical data. Each collection 661 comprises one or more historical data sets 662. Each historical data set 662 corresponds to a historical deal, and comprises actual/observed data for the deal, such as a cost data structure for each service level in a service hierarchy of the deal. As another example, in one embodiment, the storage devices 520 maintains at least one collection 665 of market data. Each collection 665 comprises one or more market data sets 666. Each market data set 666 corresponds to a market deal, and comprises actual/observed data for the deal, such as a cost data structure for each service level in a service hierarchy of the deal.

The system 500 further comprises an output interface 660 configured to provide output. As described in detail later herein, in one embodiment, the system 500 recommends one or more values for augmenting one or more missing values in historical and/or market data, and provides, as output, the recommended values. In another embodiment, the system 500 estimates costs and prices of an in-flight deal based on information relating to a set of peer deals and provides, as output, a set of price points estimated for the in-flight deal. In yet another embodiment, the system 500 predicts probability of winning an in-flight deal at any price point (e.g., an estimate provided by the system 500 or a user-specified price point), and provides, as output, a probability of winning the in-flight deal at the price point.

The system 500 is trained to differentiate between different categories of services included in any deal. In one example implementation, the different categories of services include, but are not limited to, regular services and common services.

A regular service is a service having a corresponding cost (i.e., service cost) that is independent of other services included in the same deal as the regular service. A regular service is also a service having a corresponding baseline. Examples of regular services include, but are not limited to, databases and end users. A corresponding baseline for databases is a total number of databases. A corresponding baseline for end users is a total number of end users.

A common service is a service having a corresponding cost (i.e., service cost) that is dependent on one or more regular services included in the same deal as the common service. Examples of common services include, but are not limited to, account management. A corresponding cost for account management is based on costs of all regular services included in the same deal as account management.

Augmenting Missing Values in Historical and Market Data

As stated above, one or more application units may execute/operate on the server devices 510 to provide a tool for augmenting missing values in historical and/or market data for deals.

Figure 7:
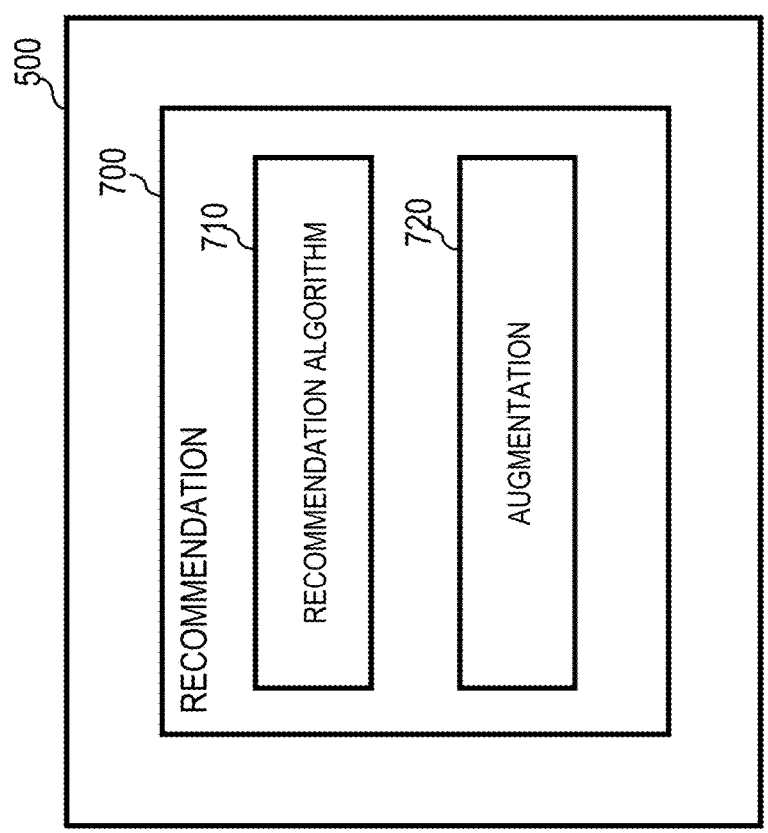
FIG. 7 illustrates an example recommendation engine, in accordance with an embodiment.

FIG. 7 illustrates an example recommendation engine 700, in accordance with an embodiment. In one embodiment, the system 500 comprises a recommendation engine 700 for augmenting missing values in historical and/or market data.

Specifically, the recommendation engine 700 comprises an augmentation unit 720 configured to recommend one or more values for augmenting one or more missing values in historical and/or market data for deals. The augmentation unit 720 may be used to recommend one or more unit cost values for augmenting one or more missing unit cost values in a cost data structure for a deal (i.e., a historical or a market deal). The augmentation unit 720 may also be used to recommend one or more baseline values for augmenting one or more missing baseline values for a deal (i.e., a historical or a market deal).

The recommendation engine 700 applies a recommendation algorithm 710 for determining one or more values (e.g., unit cost values or baseline values) to recommend. The recommendation algorithm 710 can be any type of recommendation system/algorithm. An example recommendation algorithm 710 is factorization through latent Dirichlet allocation (fLDA), as described in a publication titled "fLDA: Matrix Factorization through Latent Dirichlet Allocation" by Deepak Agarwal et al., published in the Proceedings of the 3rd ACM International Conference on Web Search and Data Mining, 2010. Using fLDA, metadata for a set of deals (i.e., historical or market deals) may be used as source context.

The augmentation unit 720 is further configured to generate a full cost data structure (e.g., a full cost matrix) for a highest service level in each deal of a set of deals (i.e., historical or market deals). A cost value for a service is represented as either a unit cost for a regular service or a percentage of total cost of the deal. The full cost data structure comprises one or more actual unit cost values and one or more recommended cost values for augmenting one or more missing unit cost values. The full cost data structure may be provided, as output, via the output interface 560 (FIG. 5).

The recommendation engine 700 may be used in different applications. For example, one embodiment of the recommendation engine 700 may be used to facilitate top-down pricing of a complex service deal. As another example, one embodiment of the recommendation engine 700 may be used to facilitate data analysis of historical deals in terms of costs, etc.

Figure 8:
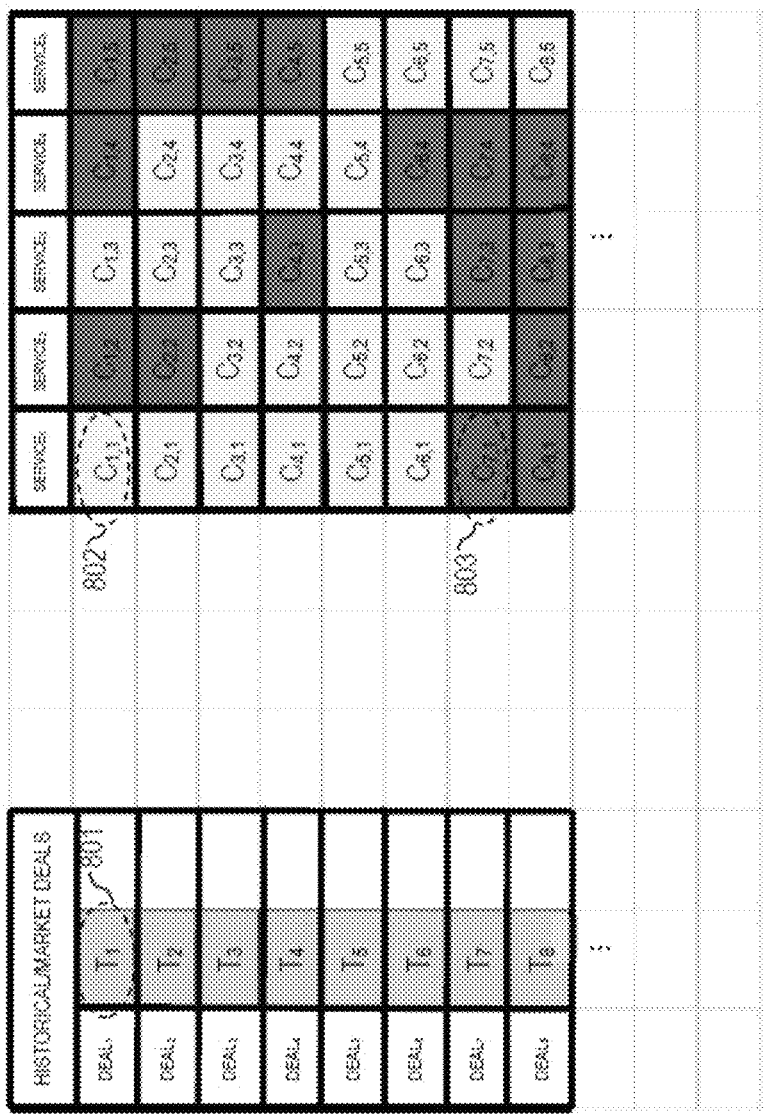
FIG. 8 illustrates an example representation of information relating to a set of deals, in accordance with an embodiment.

FIG. 8 illustrates an example representation of information relating to a set of deals, in accordance with an embodiment. As shown in FIG. 8, assume a set of deals (i.e., historical or market deals) received via the input interface 550 (FIG. 5) comprises at least eight (8) deals, where each deal has a corresponding cost data structure 801 identifying unit cost values for at least one service included in the deal. For example, the set comprises a first deal denoted as $DEAL_1$ with a corresponding cost data structure $T_1$, a second deal denoted as $DEAL_2$ with a corresponding cost data structure $T_2$, a third deal denoted as $DEAL_3$ with a corresponding cost data structure $T_3$, a fourth deal denoted as $DEAL_4$ with a corresponding cost data structure $T_4$, a fifth deal denoted as $DEAL_5$ with a corresponding cost data structure $T_5$, a sixth deal denoted as $DEAL_6$ with a corresponding cost data structure $T_6$, a seventh deal denoted as $DEAL_7$ with a corresponding cost data structure $T_7$, and an eight deal denoted as $DEAL_8$ with a corresponding cost data structure $T_8$.

Herein, an actual/observed unit cost value is referenced using reference number 802, and a recommended unit cost value is referenced using reference number 803. As shown in FIG. 8, the cost data structure $T_5$ corresponding to the fifth deal $DEAL_5$ includes actual/observed unit cost values for five different services. Specifically, the cost data structure $T_5$ includes actual/observed unit cost values $C_{5,1}$, $C_{5,2}$, $C_{5,3}$, $C_{5,4}$, and $C_{5,5}$ for services $SERVICE_1$, $SERVICE_2$, $SERVICE_3$, $SERVICE_4$, and $SERVICE_5$, respectively.

As stated above, the recommendation engine 700 (FIG. 7) may be utilized to recommend one or more unit cost values for augmenting one or more missing unit cost values in a cost data structure for a deal. In one embodiment, the recommendation engine 700 may be utilized to recommend one or more unit cost values for one or more services missing in a particular deal of the set of deals, wherein the one or more missing services are included in another deal of the set of deals. For example, the fifth deal $DEAL_5$ includes services $SERVICE_2$, $SERVICE_4$, and $SERVICE_5$, but the first deal $DEAL_1$ does not include services $SERVICE_2$, $SERVICE_4$, and $SERVICE_5$. For the first deal $DEAL_1$, the recommendation engine 700 may be utilized to recommend unit cost values for services $SERVICE_2$, $SERVICE_4$, and $SERVICE_5$ that are missing in the first deal $DEAL_1$ but included in the fifth deal $DEAL_5$. As shown in FIG. 8, the cost data structure $T_1$ corresponding to the first deal $DEAL_1$ includes actual/observed unit cost values $C_{1,1}$ and $C_{1,3}$ for services $SERVICE_1$ and $SERVICE_3$, respectively, and recommended unit cost values $C_{1,2}$, $C_{1,4}$, and $C_{1,5}$ (provided by the recommendation engine 700) for services $SERVICE_2$, $SERVICE_4$, and $SERVICE_5$, respectively. As another example, the cost data structure $T_8$ corresponding to the eighth deal $DEAL_8$ includes an actual/observed unit cost value $C_{8,5}$ for service $SERVICE_5$, and recommended unit cost values $C_{8,1}$, $C_{8,2}$, $C_{8,3}$, and $C_{8,4}$ for services $SERVICE_1$, $SERVICE_2$, $SERVICE_3$, and $SERVICE_4$, respectively.

Top-Down Pricing of a Complex Service Deal

Different approaches to pricing a complex service deal include a top-down pricing and bottom-up pricing. Conventional techniques price services in a service deal via bottom-up pricing. Pricing complex, high-valued services in a service deal via bottom-up pricing is a complex, elaborate, time-consuming, and expensive process. Bottom-up pricing involves, for each service in a service deal, estimating cost of each individual activity of the service at a granular level, wherein a sum of each estimated cost is a cost of the service. An overall price of the service contract is then determined by adding a markup/gross profit margin to either (1) each cost of each service, or (2) a sum of each cost of each service. By comparison, top-down pricing involves costing and pricing of high level services included in a service deal based on market and historical data.

As stated above, one or more application units may execute/operate on the server devices 510 (FIG. 5) to provide a tool for estimating costs and prices of an in-flight deal based on information relating to peer deals (i.e., historical or market deals). In one embodiment, the system 500 provides embodiments for alternative, agile, top-down approaches for pricing of complex service deals.

Figure 9:
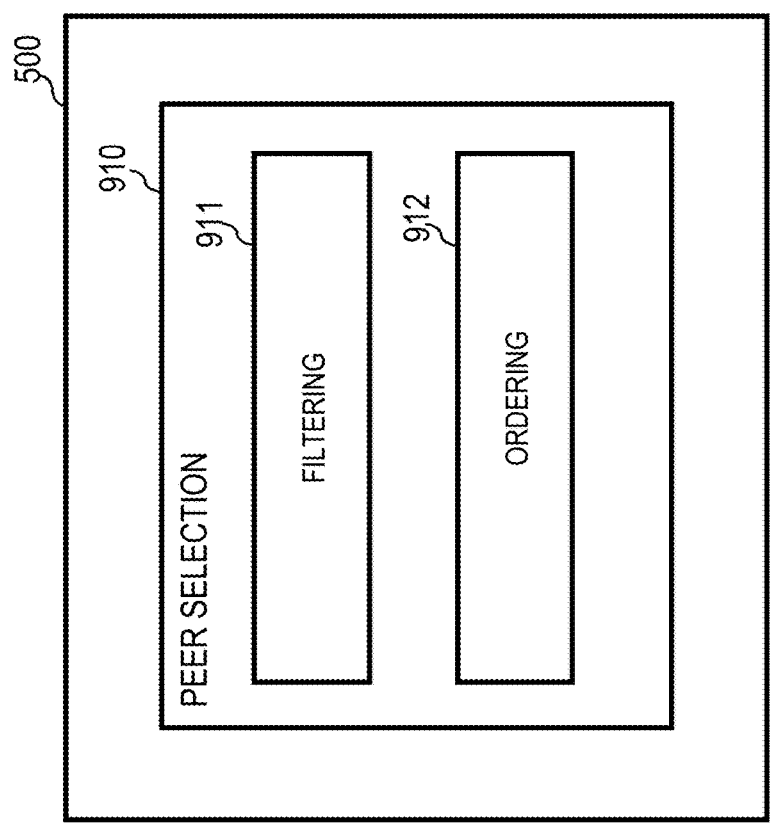
FIG. 9 illustrates an example peer selection engine, in accordance with an embodiment.

FIG. 9 illustrates an example peer selection engine 910, in accordance with an embodiment. In one embodiment, the system 500 (FIG. 5) comprises a peer selection engine 910 and a pricing engine 1000 (FIG. 10) for top-down pricing of a complex service deal.

Table 1 below provides a listing of different parameters used in this specification.

TABLE 1

| Parameter | Definition |
| --- | --- |
| d | A set of peer deals (i.e., historical or market deals) |
| s | A given in-flight deal to price. |
| Services | A set of regular services, wherein Services = {Service$_1$, . . . , Service$_M$}, M is cardinality of Services, Service$_i$ ∈ Services, and i = {1, . . . , M}. |
| Services$_s$ | A set of regular services for an in-flight deal s. |
| Baselines | A set of baseline values for Services, wherein Baseline$_i$ ∈ Baselines, and Baseline$_i$ is a unit/measure of amount of Service$_i$ provided by a service provider to a client. |
| Baselines$_s$ | A set of baseline values for regular services for an in-flight deal s. |
| CommonServices | A set of common services, wherein CommonServices = {CommonService$_1$, . . . , CommonService$_N$}, N is cardinality of CommonServices, CommonService$_j$ ∈ CommonServices, and j = {1, . . . , N}. |
| CommonServices$_s$ | A set of common services for an in-flight deal s. |
| MetaInformation | A set of metadata values for a deal, wherein MetaInformation = {DealOutcome, ContractYear, Geography, Industry}, DealOutcome is whether the deal is won or lost, ContractYear is a calendar year during which delivery of services in the deal to a client begins, Geography is a geographical location of the client, and Industry is an industry of the client. |
| MetaInformation$_s$ | A set of metadata values for an in-flight deal s. |

In one embodiment, the input interface 650 (FIG. 6) is further configured to receive, as input, information relating to an in-flight deal s. The information relating to the in-flight deal s comprises, but is not limited to, the following: (1) baselines (i.e., quantities) for a highest service level in a services hierarchy of the in-flight deal s, and (2) metadata for the in-flight deal s. For example, the information relating to the in-flight deal s comprises at least the following: (1) a set of regular services Services$_s$ included in the in-flight deal s, (2) a set of common services CommonServices$_s$ included in the in-flight deal s, (3) a set of baseline values Baselines$_s$ for the set Services$_s$, and (4) a set of metadata values MetaInformation$_s$ for the in-flight deal s.

Each regular service Service$_{s,i}$ of the set Services$_s$ is defined by a corresponding tuple (Baseline$_{s,i}$, Cost$_{s,i}$, Price$_{s,i}$), wherein Baseline$_{s,i}$ is a unit/measure of amount of the regular service Service$_{s,i}$ that will be provided, Cost$_{s,i}$ is a total cost of the regular service Service$_{s,i}$, and Price$_{s,i}$ is a price of the regular service Service$_{s,i}$.

Each common service CommonService$_{s,j}$ of the set CommonServices$_s$ is defined by a corresponding tuple (PercentageOfTotalCost$_{s,j}$, TotalCost$_s$, TotalPrice$_s$), wherein PercentageOfTotalCost$_{s,j}$ is cost of the common service CommonService$_{s,j}$ as a percentage of total cost of the in-flight deal s, TotalCost$_s$ is the total cost (i.e., sum) of all regular services Services$_s$ and all common services CommonServices$_s$ for the in-flight deal s, and TotalPrice$_s$ is the total cost (i.e., sum) of all regular services Services$_s$ and all common services CommonServices$_s$ for the in-flight deal s. TotalCost$_s$ is a total cost that a service provider pays to provide the in-flight deal s (i.e., cost of labor, hardware, etc.). TotalPrice$_s$ is a total price that is provided as a potential bidding price (i.e., the TotalCost$_s$ plus some pre-determined profit margin provided as a user-specified input parameter).

In one embodiment, the peer selection engine 910 is configured to: (1) load historical and/or market data from the storage devices 520 (FIG. 5), and (2) for each service in the in-flight deal s, select at least one corresponding set of peer deals for the service. In one example implementation, the peer selection engine 910 executes the selection in two stages. In a first stage, a filtering unit 911 of the peer selection engine 910 filters the historical and/or market data based on metadata for the in-flight deal s. Specifically, the filtering unit 911 filters out peer deals having metadata values for respective fields that do not match the set of metadata values MetaInformation$_s$ (i.e., {DealOutcome$_s$, ContractYear$_s$, Geography$_s$, Industry$_s$}) for the in-flight deal s. For instance, a service delivered from Asia is likely to have a different delivery cost compared to a service delivered to North America. Similarly, delivery of a service in 2016 is likely to happen at a different cost compared to delivery of the same service in 2017. Further, for each service in the set Services$_s$ or the set CommonServices$_s$, the filtering unit 911 filters out peer deals that do not include the service. Each service in the set Services$_s$ or the set CommonServices$_s$ has at least one corresponding set of peer deals.

In one embodiment, peer selection is done separately for historical deals and market deals, such that cost computation for an in-flight deal s is computed from two different perspectives—historical pricing and current market pricing. Each service in the set Services$_s$ or the set CommonServices$_s$ has at least one of a corresponding set of historical deals and a corresponding set of market deals.

In one embodiment, each set of historical deals corresponding to each service in the set Services$_s$ or the set CommonServices$_s$ must include a minimum number of historical deals; if this condition is not satisfied, the peer selection engine 910 outputs, via the output interface 660 (FIG. 6), a report indicating that no data was found for historical pricing. A user 530 (FIG. 5) may specify, as a user-specified input parameter, the minimum number of historical deals required.

In a second stage, an ordering unit 912 of the peer selection engine 910 orders each set of peer deals corresponding to each service in the set Services$_s$ or the set CommonServices$_s$. Specifically, for each set of peer deals corresponding to each service in the set Services$_s$, the ordering unit 912 applies a sorting criteria based on proximity of baseline values.

In this specification, BaselineProximity$_{dsi}$ is proximity (i.e., difference) of baseline values of a peer deal and the in-flight deal s. In one embodiment, BaselineProximity$_{dsi}$ is computed in accordance with equation (1) provided below:

$$\text{BaselineProximity}_{dsi} = |\text{Baseline}_{d,i} - \text{Baseline}_{s,i}| \quad (1),$$

wherein Baseline$_{d,i}$ is a baseline value for Service$_i$ of a peer deal d, and Baseline$_{s,i}$ is a baseline value for Service$_i$ of the in-flight deal s.

The peer selection engine 910 assumes that a peer deal and the in-flight deal s are similar with respect to a service if the proximity (i.e., difference) between baseline values is small. Unit costs are typically similar for deals with similar/close proximity as baseline values define complexity of services. Variation of unit costs for the same service across different deals is related to the quantity (baselines) of that service in each deal. It should be noted that for some kind of services (referred to as regular services, which are countable services, such as databases and end users), baseline is the amount of any of these services, i.e., quantity. Therefore, the baselines for databases is the number of databases, and that for end users is the number of end users, etc. While service providers may achieve a quantity discount on unit costs for larger quantities, there is presently no set function that relates such quantity discount to baselines. The ordering unit 912 orders each set of peer deals corresponding to each service in the set Services$_s$ based on proximity of baseline values, resulting in an ordered set of peer deals.

For each set of peer deals corresponding to each service in the set CommonServices$_s$, the ordering unit 912 applies a sorting criteria based on proximity of total cost of regular services. In this specification, CommonServiceProximity$_{dsi}$ is proximity (i.e., difference) between a peer deal and the in-flight deal s based on total cost of regular services. In one embodiment, CommonServiceProximity$_{dsi}$ is computed in accordance with equation (2) provided below:

$$\text{CommonServiceProximity}_{dsi} = |\text{TotalCost}_{Services,d} - \text{TotalCost}_{Services,s}| \quad (2),$$

wherein TotalCost$_{Services,d}$ is total cost (i.e., sum) of all regular services for a peer deal d, and TotalCost$_{Services,s}$ is total cost (i.e., sum) of all regular services for the in-flight deal s. The ordering unit 912 orders each set of peer deals corresponding to each common service in the set CommonServices$_s$ based on proximity of total cost of regular services, resulting in an ordered set of peer deals.

Finally, the peer selection engine 910 sets a maximum threshold T for each ordered set of peer deals. Typically, for an ordered set of market deals, the maximum threshold T is one (1), whereas for an ordered set of historical deals, the maximum threshold T is set by a user 530. For each ordered set of peer deals, the top T peer deals of the set are used to determine costs for each service in the set Services$_s$ or the set CommonServices$_s$. Cost calculation for each service is performed for each year of the total number of contract years of the in-flight deal s.

In one embodiment, if a cost data structure for a peer deal selected by the peer selection engine 910 is missing one or more unit cost values for one or more services in the in-flight deal s, the system 500 may utilize the recommendation engine 700 (FIG. 7) to augment the missing unit cost values with recommended unit cost values.

Figure 10:
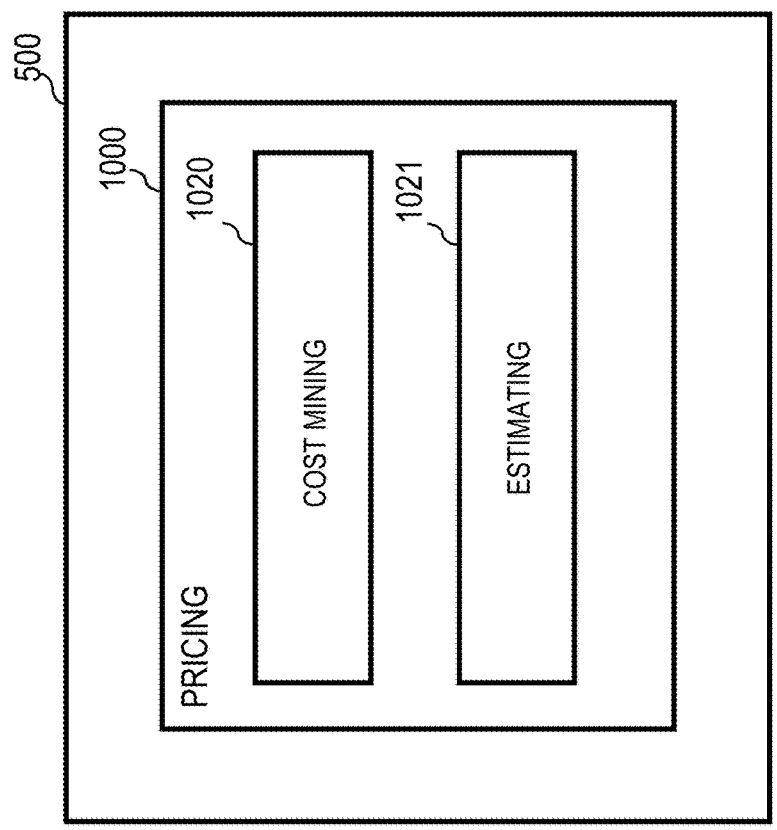
FIG. 10 illustrates an example pricing engine, in accordance with an embodiment.

FIG. 10 illustrates an example pricing engine 1000, in accordance with an embodiment. The pricing engine 1000 is configured to: (1) for each regular service of the set Services$_s$ estimate a corresponding cost and a corresponding price for the regular service, (2) for each common service of the set CommonServices$_s$, estimate a corresponding cost and a corresponding price for the common service, and (3) estimate a total cost and a total price for the in-flight deal s based on each cost and each price estimate for each regular service and each common service included in the in-flight deal s.

In one embodiment, the pricing engine 1000 requires a full cost data structure for determining a set of price points for an in-flight deal s. If a cost data structure for a peer deal is missing one or more unit cost values for one or more services in the in-flight deal s, the system 500 (FIG. 5) may utilize the recommendation engine 700 to augment the missing unit cost values with recommended unit cost values during the top-down pricing of the in-flight deal s.

In one embodiment, the pricing engine 1000 comprises a cost mining unit 1020 configured to, for each service included in the in-flight deal s, mine costs from a corresponding set of peer deals for the service (e.g., a corresponding set of historical deals or a corresponding set of market deals selected by the peer selection engine 1010). Specifically, the cost mining unit 1020 is configured to: (1) mine costs for the set Services$_s$, and (2) mine costs for the set CommonServices$_s$.

In one example implementation, for each regular service of the set Services$_s$, the cost mining unit 1020 computes, for each peer deal of an ordered set of peer deals for the service, a unit cost of the service in the peer deal by dividing a cost of the service by its baseline value. The cost mining unit 1020 then retrieves a $l^{th}$ percentile of the unit costs computed. In one embodiment, the $l^{th}$ percentile is the median. In another embodiment, the $l^{th}$ percentile is an arbitrary value provided by a user 530 as a user-specified input parameter. In this specification, Unit-cost$_i$ is a unit cost of regular service Service$_i$, Baseline$_i$ is a baseline value of regular service Service$_i$, and Cost$_{s,i}$ is a cost of regular service Service$_i$ for the in-flight deal s. In one embodiment, Cost$_{s,i}$ is computed in accordance with equation (3) provided below:

$$\text{Cost}_{s,i} = \text{Unit-cost}_i * \text{Baseline}_i \quad (3).$$

In one example implementation, for each common service of the set CommonServices$_s$, the cost mining unit 1020 computes, for each peer deal of an ordered set of peer deals for the service, a percentage of cost of the service to the overall cost of the peer deal. The cost mining unit 1020 then retrieves a $k^{th}$ percentile of the percentages computed. In one embodiment, the $k^{th}$ percentile is the median. In another embodiment, the $k^{th}$ percentile is an arbitrary value provided by a user 530 as a user-specified input parameter.

The pricing engine 1000 further comprises an estimating unit 621 for estimating a total cost and a total price of the in-flight deal s. In this specification, $P_{s,j}$ is a resulting percentage value of a common service CommonService$_j$, SUM$_{s,reg}$ is a total cost of all regular services of the in-flight deal s, and SUM$_{s,all}$ is a total cost of all services (i.e., regular services and common services) of the in-flight deal s. In one embodiment, $SUM_{s,all}$ and $Cost_{s,i}$ are simultaneously computed in accordance with formalized equations (4)-(5) provided below:

$$SUM_{s,all} = \Sigma Cost_{s,j} + SUM_{s,reg} \quad (4), \text{ and}$$

$$Cost_{s,i} = SUM_{s,all} * P_{s,j} \quad (5).$$

In one embodiment, the equations (4)-(5) are transformed to the following format:

$$(P_{s,1} - 1) * Cost_{s,1} + (P_{s,1} - 1) * Cost_{s,2} + \ldots +$$
$$(P_{s,1} - 1) * Cost_{s,J} = -P_{s,1} * SUM_{s,reg}$$
$$(P_{s,2} - 1) * Cost_{s,1} + (P_{s,2} - 1) * Cost_{s,2} + \ldots +$$
$$(P_{s,2} - 1) * Cost_{s,J} = -P_{s,2} * SUM_{s,reg}$$
$$\ldots \ldots \ldots$$
$$(P_{s,J} - 1) * Cost_{s,1} + (P_{s,J} - 1) * Cost_{s,2} + \ldots +$$
$$(P_{s,J} - 1) * Cost_{s,J} = -P_{s,J} * SUM_{s,reg},$$

wherein J is the cardinality of the set $CommonServices_s$. In one embodiment, Cramer's rule is applied to compute cost of each common service per year in accordance with the equations provided above.

As stated above, cost computation for the in-flight deal s may be computed from the perspective of historical pricing and the perspective of current market pricing. One difference in computing costs from the perspective of market pricing compared to historical pricing is that, with regards to market data, percentiles for computing unit costs for regular services and unit percentages for common services are not applied when the maximum threshold of market deals is set to one (1).

From the perspective of historical pricing, the pricing engine 1000 estimates a total cost of the in-flight deal s by adding up costs of all regular services $Services_s$ and all common services $CommonServices_s$ computed using corresponding sets of historical deals (e.g., sets of historical deals selected by the peer selection engine 910), and tacking on a pre-determined gross profit (e.g., an arbitrary value provided as a user-specified input parameter) to the total cost estimated to obtain a total price of the in-flight deal s. From the perspective of market pricing, the pricing engine 1000 estimates a total cost of the in-flight deal s by adding up costs of all regular services $Services_s$ and all common services $CommonServices_s$ computed using corresponding sets of market deals (e.g., sets of market deals selected by the peer selection engine 1010), and tacking on a pre-determined gross profit (e.g., an arbitrary value provided as a user-specified input parameter) to the total cost estimated to obtain a total price of the in-flight deal s.

Figure 11:
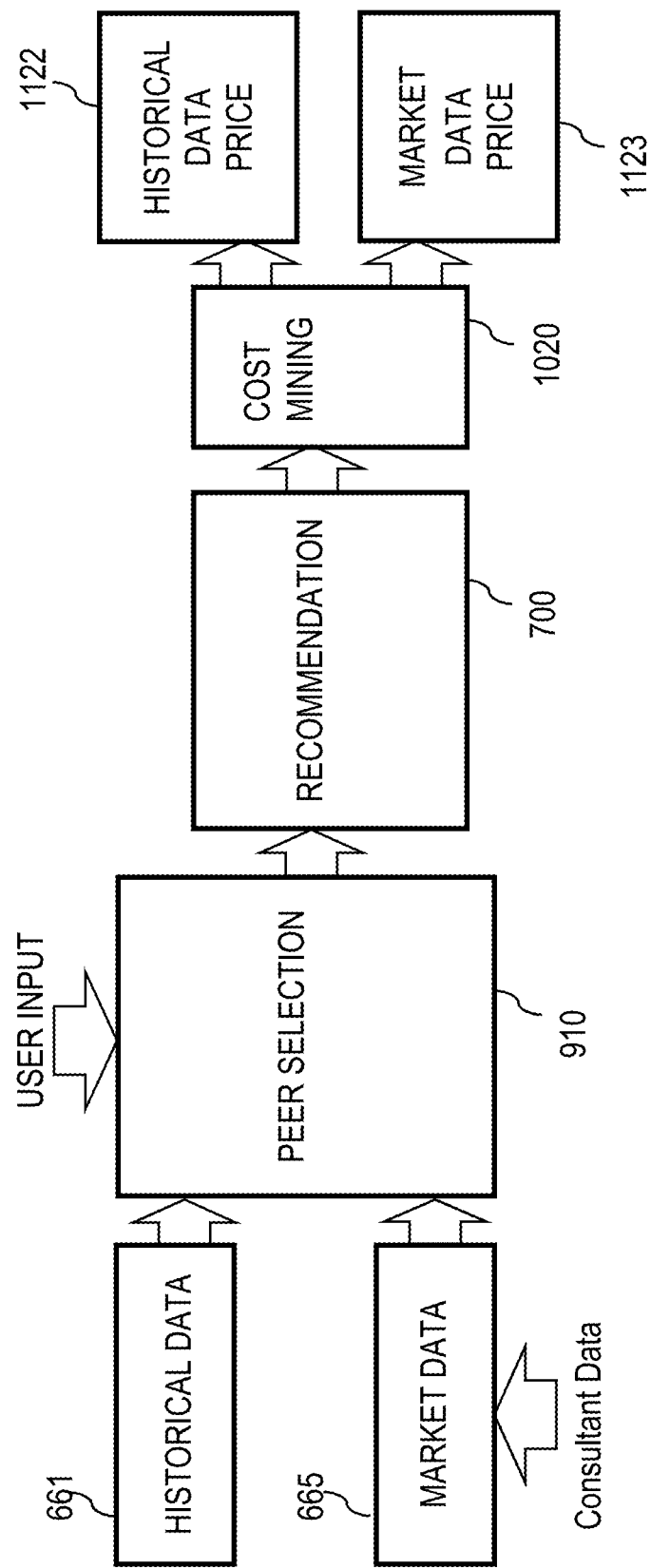
FIG. 11 illustrates an example process for determining a set of price points for an in-flight deal, in accordance with an embodiment.

FIG. 11 illustrates an example process for determining a set of price points for an in-flight deal, in accordance with an embodiment. To determine a set of historical data price points 1122 from the perspective of historical pricing, the system 500 (FIG. 5) loads historical data from at least one collection 661 of historical data maintained on the storage devices 520. To determine a set of market data price points 1123 from the perspective of market pricing, the system 500 loads market data from at least one collection 665 of market data maintained on the storage devices 520. The market data loaded may include data provided by consultants.

For each service in the in-flight deal, the system 500 utilizes the peer selection engine 910 to: (1) select a corresponding set of historical deals for the service, and (2) select a corresponding set of market deals for the service. The peer selection engine 910 may select peer deals based on one or more user-specified input parameters (e.g., minimum number of historical deals required).

For each service in the in-flight deal, if a peer deal (i.e., historical deal or market deal) selected for the service is missing one or more unit cost values, the system 500 may utilize the recommendation engine 700 to recommend unit cost values for augmenting the missing unit cost values.

For each service in the in-flight deal, the system 500 utilizes the cost mining unit 1020 of the pricing engine 1000 (FIG. 10) to: (1) mine unit costs from a corresponding set of historical deals selected for the service, and (2) mine unit costs from a corresponding set of market deals selected for the service. The system 500 then utilizes the estimating unit 1021 of the pricing engine 1000 to: (1) estimate a set of historical data price points 1122 using unit costs mined from each set of historical deals selected, and (2) estimate a set of market data price points 1123 using unit costs mined from each set of market deals selected.

Assessing Probability of Winning a Service Deal for Different Price Points

As stated above, one or more application units may execute/operate on the server devices 510 to provide a tool for predicting probability of winning an in-flight deal at any price point based on historical data pricing, market data pricing, a user-specified price, and/or any other price point.

Figure 12:
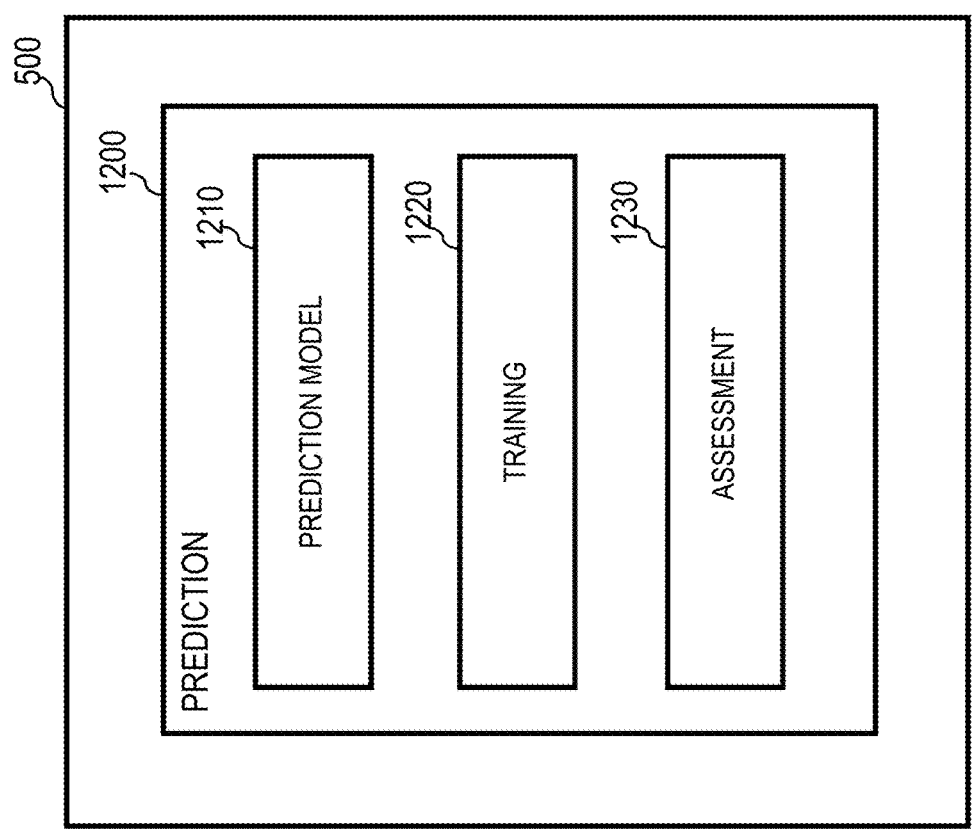
FIG. 12 illustrates an example prediction engine, in accordance with an embodiment.

FIG. 12 illustrates an example prediction engine 1200, in accordance with an embodiment. In one embodiment, the system 500 (FIG. 5) comprises a prediction engine 1200 for predicting probability of winning an in-flight deal at any price point based on historical pricing, market pricing, a user-specified price, and/or any other price point.

The prediction engine 1200 is configured to receive, as input, one or more sets of price points for an in-flight deal. The sets of price points received may include a set of historical data price points, a set of market data price points, and/or a set of user-specified price points. In one embodiment, at least one set of price points received is provided by the pricing engine 1000. In one embodiment, at least one set of price points received is provided as a user-specified input parameter via the input interface 550. For each set of price points received, the prediction engine 1200 is configured to provide, as output, a prediction of probability (i.e., likelihood) of winning the in-flight deal for each price point of the set of price points.

The prediction engine 1200 comprises a training unit 220 configured to apply, in a training stage, known supervised machine learning techniques to train a predictive analytics model ("prediction model") 1210 for use in assessing probability of winning an in-flight deal for any price point. The prediction model 210 is trained based on metadata for peer deals.

In one embodiment, the prediction model 1210 is a naïve Bayesian model.

In one embodiment, the prediction engine 1200 further comprises an assessment unit 1230 configured to assess, based on the prediction model 1210, probability of winning an in-flight deal for each price point of a set of price points.

Metadata for a deal (e.g., an in-flight deal, a peer deal) comprises at least one attribute of the deal ("deal attribute"). In one embodiment, deal attributes that are significant/influential factors in assessing probability of winning an in-flight deal for any price point include, but are not limited to, at least one of the following:

(a) Client-market segmentation: This factor indicates market segment of a client by classifying the client based on size, market audience, and business market potential. For example, a client having a small or medium enterprise will have different characteristics and requirements than a client having a large multi-national enterprise. Service providers are typically assigned to market segments that they are specialized/experts in.

(b) Geography: This factor indicates geographical location of a client.

(c) Industry: This factor indicates an industry area of a client.

(d) Deal complexity: This factor indicates complexity of a deal based on services included in the deal. Multiple levels of deal complexity may be defined by a business. The more complicated services included in a deal are in terms of number of services to deliver, amount of effort required to deliver the services, and degree of client interaction required, the higher the level of deal complexity for the deal.

(e) Global vs local: This factor indicates whether a deal is global or local. A deal is global if services included in the deal are delivered to multiple countries that are not within close proximity of one another. By comparison, a deal is local if services included in the deal are delivered to only one country or two countries within close proximity of each other (e.g., Australia and New Zealand, or U.S.A. and Canada).

(f) Delivery executive: A deal may be assigned to a delivery executive responsible for delivery of services of the deal after contract signing. This factor indicates whether a delivery executive is assigned to a deal at an early stage of the deal or not.

(g) Third party advisor: A client may use a third party advisor to help them determine a winning bid from the perspective of a neutral expert. This factor indicates whether a client has a third party advisor or not.

(h) Contract length: This factor indicates duration of delivery of services included in a deal. The duration typically ranges anywhere from one (1) to eight (8) years, though there are some exceptional circumstances where the duration may be longer.

(i) Number of competitors: This factor indicates total number of competitors bidding on the same deal.

(j) Competitor classification and analysis: Competitors bidding on the same deal are classified based on competitor type. Examples of competitor types include, but are not limited to, multi-national service providers, local service providers, and low-cost service providers. Multi-national service providers are competitors that offer services globally (i.e., world-wide) or at least in multiple countries, and can deliver the services from multiple countries. Local service providers are competitors that offer services locally in one or two countries only. Low-cost service providers are competitors known to offer lower cost services, and are typically from off-shore/global resourcing countries (e.g., India, China). The presence of low-cost service providers as competitors, however, does not necessarily reduce chances of winning a deal as some clients (e.g., larger clients or clients with more expensive contracts) may prefer to select a local service provider even if this is more expensive. Competitors may be further classified based on whether they are niche or consultant. Niche service providers are specialized in a particular type of industry, sector, or service; presence of niche service providers as competitors may strongly influence chances of winning a deal. Some competitors have a consultant built-in arm that some clients may have a preference for. Further, for an IT service deal, competitors may be classified further based on whether they provide cloud services, software services, or network services.

Figure 13A:
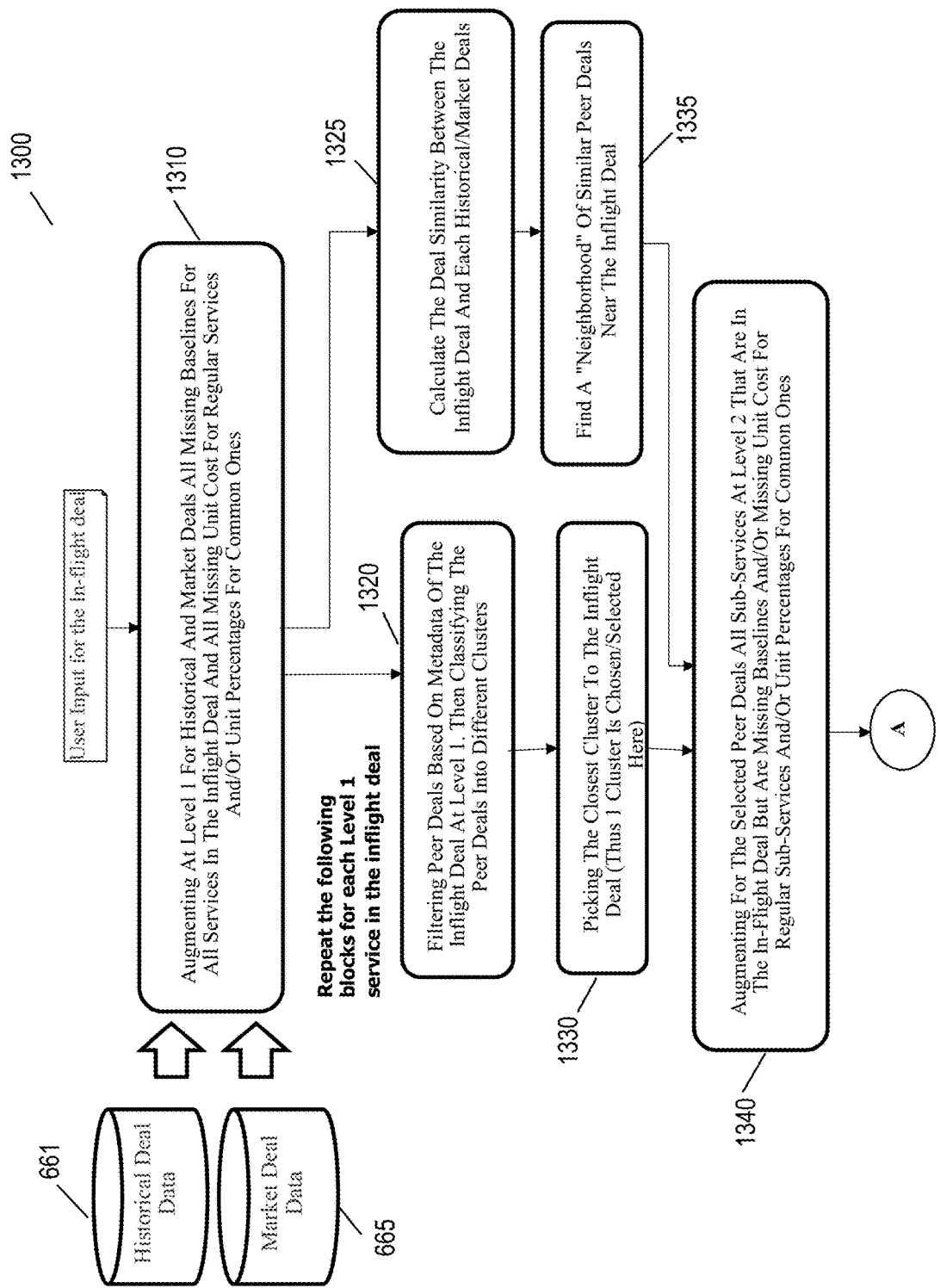
FIGS. 13A-B illustrates an example process for selecting peers for IT service deals, in accordance with an embodiment.
Figure 13B:
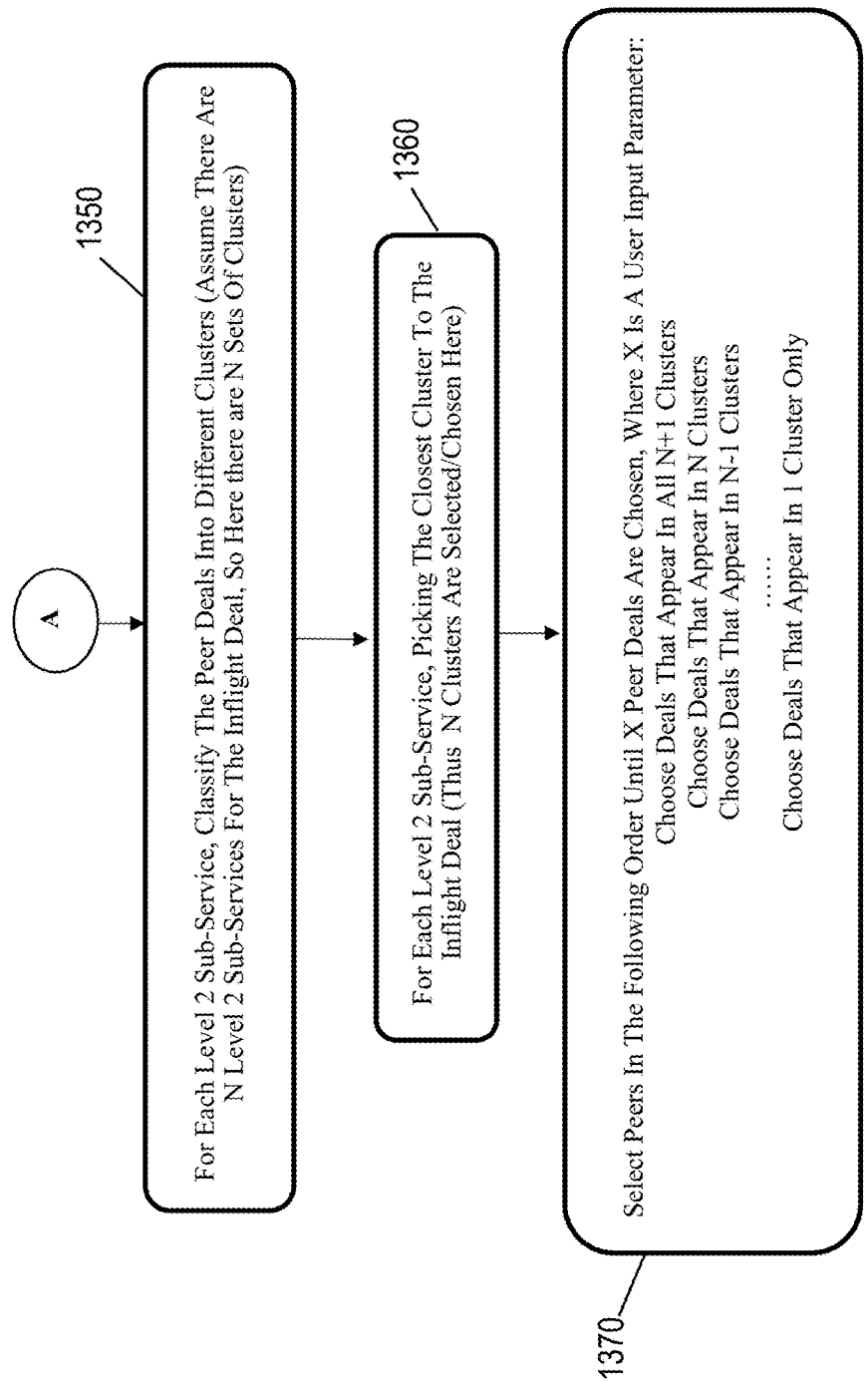

FIGS. 13A-B illustrates an example process 1300 for selecting peers for IT service deals, in accordance with an embodiment. In one embodiment, after augmenting missing values for level one services 1310 (as described above), the following processing techniques are repeated for each level one service. In one embodiment, filtering 1320 is performed by the filtering unit 911 (FIG. 9) based on metadata of the in-flight deal at level one. In one example, the Meta Information (Deal Outcome, Contract Year, Geography, and Industry) of the scenario is used to filter in the deals that have the matching values for respective fields. The reason behind this is that each of these fields is a characteristic of the deal and affects the cost of delivering each of its services. Next, classification is performed using clustering for each level one service of the in-flight deal. A clustering algorithm/process (for example, k or x-means) is applied to the set of peer deals to classify them and then at obtain the centroid for each cluster of peer deals.

In another embodiment, peer selection is performed by the using the Deal Similarity as in block 1325. This approach uses user rating data to compute the similarity between users or items. This is used for making recommendations that are neighborhood-based CF and item-based/user-based top-N recommendations. A Deal-Similarity is created to encapsulate a notion of similarity among deals based on baselines. The similarity algorithm is selected that is appropriated for the set of data. The similarity used in the recommendation algorithm 710 (FIG. 7) has a high precision, recall and a small difference between predicted and actual values for deals. For example: Euclidean Distance Similarity.

In one embodiment, in block 1330 the cluster of Peer deals is picked based on whose centroid is closest to the baseline of the in-flight deal for that service using: argmin_k|centroid_k-baseline of in-flight deal|. In one embodiment, one cluster is chosen. In block 1335 a "neighborhood" of similar deals near a given deal is determined/found using baselines of the deals. The deal based top-N recommendation algorithm uses a similarity-based vector model to identify the k most similar deals to the in-flight deal. It uses the Deal-Similarity created in block 1325.

In one embodiment, in block 1340 the process 1300 performs augmenting missing values for level two sub-services—using the augmentation technique (as described above) to augment at level two for historical and market deals all missing baselines for all possible sub-services and/or all missing unit cost for regular sub-services and/or unit percentages for common ones.

In one embodiment, in block 1350, for each level two sub-service, filtering based on Metadata, use the Meta Information (Deal Outcome, Contract Year, Geography, and Industry) of the scenario to filter in the deals that have the matching values for respective fields. The reason behind this is that each of these fields is a characteristic of the deal and affects the cost of delivering each of its services. Then classifying the Peer deals into different clusters for each level two sub-service (assume there are n level two sub-services for the in-flight deal, so here there are n sets of clusters). The clustering algorithm is applied (for example, k or x-means) to the set of peer deals to classify them and get the centroid for each cluster of peer deals.

In one embodiment, in block 1360 for each level two sub-service, the cluster of Peer deals whose centroid is closest to the baseline of the in-flight deal for that service is picked/selected using: argmin_k|centroid_k-baseline of in-flight deal|. Thus, n clusters are selected/chosen in block 1360. Next, process 1300 has n+1 clusters (1 cluster was chosen in block 1330 and n clusters were chosen in block 1350, each having some deals. In block 1370 deals are selected/chosen in the following order until x peer deals are chosen, where x is a user input parameter:

Choose deals that appear in $n+1$ clusters;
Choose deals that appear in $n$ clusters;
Choose deals that appear in $n-1$ clusters;
⋮
Choose deals that appear in 1 cluster only.

Note that the ties in any of the above categories are broken by sorting the deals according to the proximity of their level one baseline after putting deals with no augmented values at level one on top. In one embodiment, the classification using clustering at level 2 may guarantee that the baselines(quantity information)/structures of level 2 for the peer deals matches that of the in-flight deal. The augmentation of the missing baselines and costs at any given level 1 may guarantee that similar deals to the in-flight deal are chosen even if they originally did not have that particular service in them.

Figure 14:
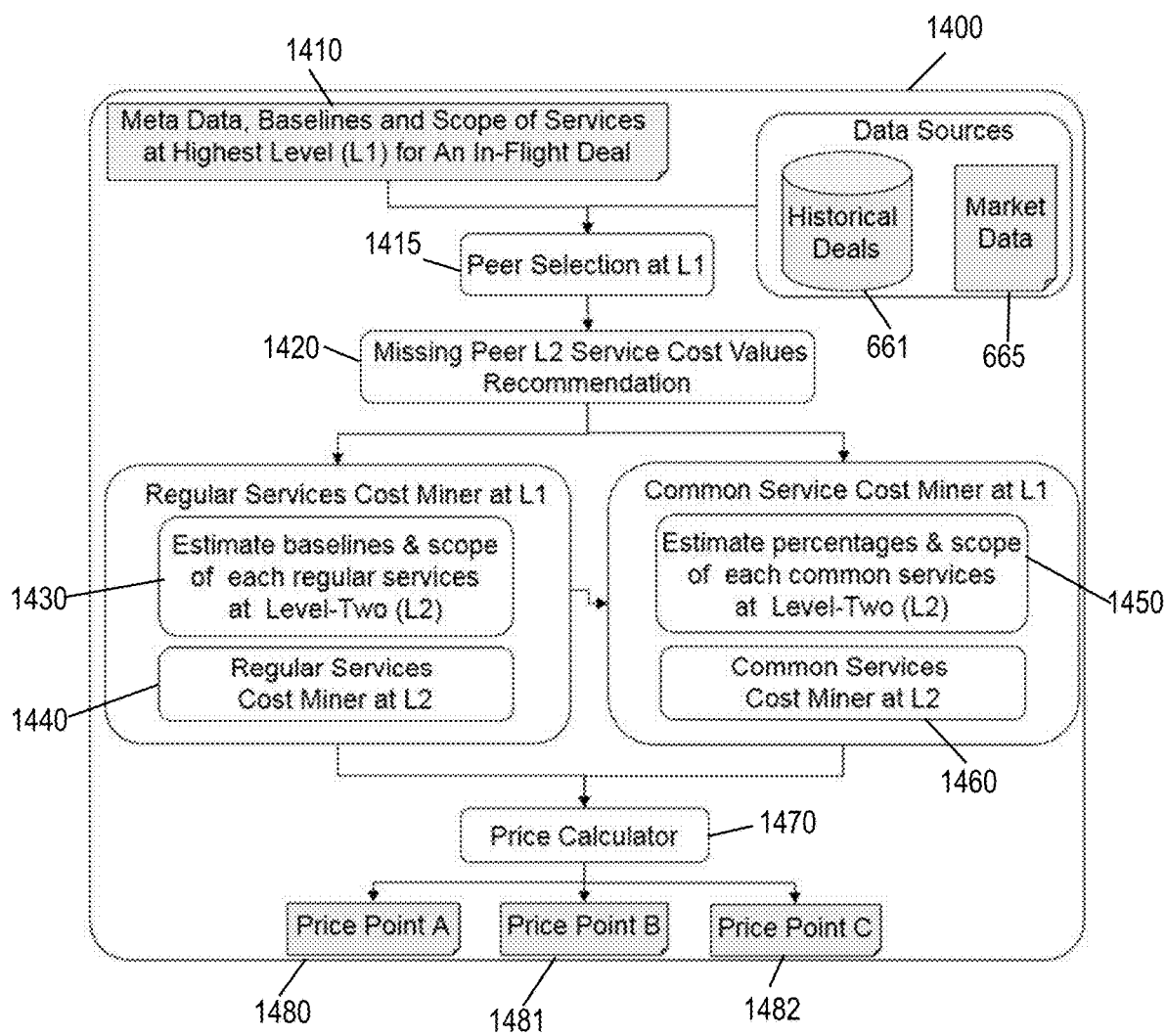
FIG. 14 illustrates an example process for generating top down information of IT service deals using lower level data, in accordance with an embodiment.

FIG. 14 illustrates an example process 1400 for generating top down information of IT service deals using lower level data, in accordance with an embodiment.

Calculating Scope and Baselines for Services at Level Two

In one embodiment, an approach requires scope and baseline values for services at level one 1410 (for an in-flight deal). Hence one or more embodiments estimate scope and baselines values for services at level two. Each ∀Service k∈Services$_s$ has many L2Service$_{ka}$∈L2Services$_s$. In one embodiment, the in-scope services are determined via learning from historical similar peer deals as to whether each service should be included or not. That is, for each service a 0-1 classification model is generated that is trained on historical data and that is then used on the in-flight deal to determine whether that service is in-scope for that deal or not. To determine which of these are in-scope, one embodiment relies on a set of predefined business rules. To calculate the baselines for L2Service$_{ka}$∈L2Services$_s$, one embodiment uses the peer deal selected for the corresponding level one Service k E Services$_s$ from market benchmark data at block 1415 using the historical deals 661 and market data 665. Herein p$_m$∈D is denoted as the market peer deal for a Service k E Services$_s$ of a scenario S, Baseline$_{pma}$ as the baseline of the corresponding L2Service$_{ka}$ of peer p$_m$, and Baseline$_{pmi}$ as the corresponding level one Service$_i$ of peer p$_m$. Then the baselines for L2Service$_{ka}$∈L2Services$_s$ can be defined as:

$$L2Baseline_{ka} = \frac{L2BaseLine_{pma} * Baseline_k}{Baseline_{pmi}} \quad (6)$$

Recommending Missing Service Cost

One embodiment determines the recommended service cost values for selected peers for services of a scenario. For each service, Service k∈Services$_s$ of a scenario S, assume that there are selected peer deals p$_h$∈D where h={1, . . . , H}, and H is the number of selected peers of that particular Service k E Services$_s$. For each L2Service$_{ha}$∈L2Services$_h$ of the corresponding service from each peer, the cost is denoted as L2Cost$_{ha}$ which may be missing for some peers.

At block 1420, for the peers that do not have the L2Cost$_{ha}$, one embodiment uses a recommendation algorithm to estimate cost values from the pool of selected peers p$_h$∈D. Note that these selected peers of particular Service k∈Services$_s$ are similar to each other with respect to a) their Meta information, and b) baseline proximity for regular services.

Estimating Costs/Prices

One or more embodiments estimate the costs for each regular services at blocks 1430 and 1440 and common service at blocks 1450 and 1460 for both the historical data 661 and market data 665 benchmark views.

Cost Calculation for Regular Services of a Scenario

In one embodiment, in block 1430 for each L2Service$_{ka}$ of Service k∈Services$_s$, the unit costs of that level two service in each of its sorted peer deals is retrieved, and then the $1^{th}$ percentile of these peer unit costs are computed. For L2Service$_{ka}$, the resulting unit cost is denoted as L2Unit-Cost$_{ka}$ and its cost is computed as follows:

$$L2Cost_{ka}=L2Unit\text{-}Cost_{ka}*L2Baseline_{ka} \quad (7)$$

One embodiment computes the cost of the Service k E Services$_s$, as follows:

$$Cost_{ka}=\Sigma_{a\in L2\ Serivces_k}L2Cost_{ka} \quad (8)$$

In block 1440 costs are mined at level two for regular services using a cost miner.

Cost Calculation for Common Services of a Scenario

In block 1450, for each L2CommonService$_{s,l,b}$ of Common Service l∈Common Services$_s$, one embodiment calculates the percentage of the cost for that level two service to the overall cost of the deal in each of its sorted peer deals. That percentage is then used as is without any normalization and the $1^{th}$ percentile is applied to the set of percentages of these peer percentages values to get the percentage of that service to the total cost of our scenario S. For each L2CommonService$_{s,l,b}$, the resulting percentage is denoted as L2P$_{s,l,b}$.

Next the price calculator at block 1470 provides calculation of the cost values for each L2CommonService$_{s,l,b}$ and applied to price points A 1480, price point B 1481, price point C 1482, etc. In one embodiment, the total cost of all services in this scenario S is defined as:

$$Sum_{s,all}=\Sigma_{s,com}+Sum_{s,reg} \quad (9)$$

where SUM$_{s,all}$ is the total cost of the scenario (sum of the costs for all services, both regular and common ones); Sum$_{s,reg}$ is the sum of the costs for the regular services-Service k∈Services$_s$; SUM$_{s,com}$ is the sum of the costs for the common services-Common Service l∈Common Services$_s$ and computed as follows:

$$Sum_{s,com}=\Sigma_{l\in Common\ Services_s}Cost_{s,l} \quad (10)$$

where Cost$_{s,l}$ refers to the cost of Common Service l∈Common Services$_s$. Cost$_{s,l}$ can be further defined using the level two cost values as follows:

$$Cost_{s,l}=\Sigma_{b\in L2Common\ Services_{s,l}}Cost_{s,l,b} \quad (11)$$

In one embodiment, Cost$_{s,l}$ in equation (10) is replaced with the definition in equation (11) which leads to the following:

$$Sum_{s,com}=\Sigma_{l\in Common\ Services_s}\Sigma_{b\in L2Common\ Services_{s,l}}Cost_{s,l,b} \quad (12)$$

For each L2Common Services$_{s,l,b}$ in the scenario S:

$$Cost_{s,l,b}=Sum_{s,all}*L2P_{s,l,b} \quad (13)$$

Finally, the above set of linear equations is transformed to a standard form as follows:

$$(P_{s,1,1}-1)*\text{Cost}_{s,1,1}+P_{s,1,1}*\text{Cost}_{s,1,2}+ \ldots +$$
$$P_{s,1,1}*\text{Cost}_{s,1,B_1}+P_{s,1,1}*\text{Cost}_{s,2,1}+ \ldots +$$
$$P_{s,1,1}*\text{Cost}_{s,2,B_2}+P_{s,1,1}*\text{Cost}_{s,L,B_L}=-P_{s,1,1}$$
$$*\text{Sum}_{s,reg} \quad (15)$$

$$P_{s,1,2}*\text{Cost}_{s,1,1}+(P_{s,1,2}-1)*\text{Cost}_{s,1,2}+ \ldots +$$
$$P_{s,1,2}*\text{Cost}_{s,1,B_1}+P_{s,1,2}*\text{Cost}_{s,2,1}+ \ldots +$$
$$P_{s,1,1}*\text{Cost}_{s,2,B_2}+P_{s,1,2}*\text{Cost}_{s,L,B_L}=-P_{s,1,2}$$
$$*\text{Sum}_{s,reg} \quad (16)$$

$$P_{s,l,b}*\text{Cost}_{s,1,1}+(P_{s,1,2}1)*\text{Cost}_{s,1,2}+ \ldots +P_{s,l,b}*$$
$$\text{Cost}_{s,l,B_1}+P_{s,l,2}*\text{Cost}_{s,2,1}+ \ldots +P_{s,1,1}*$$
$$\text{Cost}_{s,2,B_2}+(P_{s,l,b}-1)*\text{Cost}_{s,L,B_L}=-P_{s,L,B}*\text{Sum}_{s,reg} \quad (17)$$

where L refers to the cardinality of the set Common Services$_s$; $B_1, B_2, \ldots B_L$ are cardinalities of the sets L2Common Sevices$_1, \ldots,$ L2Common Services$_L$. One or more embodiments solves these equations straightforwardly as they fulfill the requirement for such set of linear equations. By solving the above equations, one embodiment computes the cost of each common service at level-two (Cost$_{s,l,b}$) per year.

In one embodiment, to aggregate the costs at deal level, the costs for services at level two are added to get the costs at level one. Then, one embodiment sums up all level one service costs to compute the cost at deal or scenario level. To estimate the price, one embodiment adds chosen arbitrary gross profits to the estimated costs. In one embodiment, the outputted prices are straightforwardly embedded in a prediction model in order to assess the probability of winning the deal at different pricing points.

Figure 15:
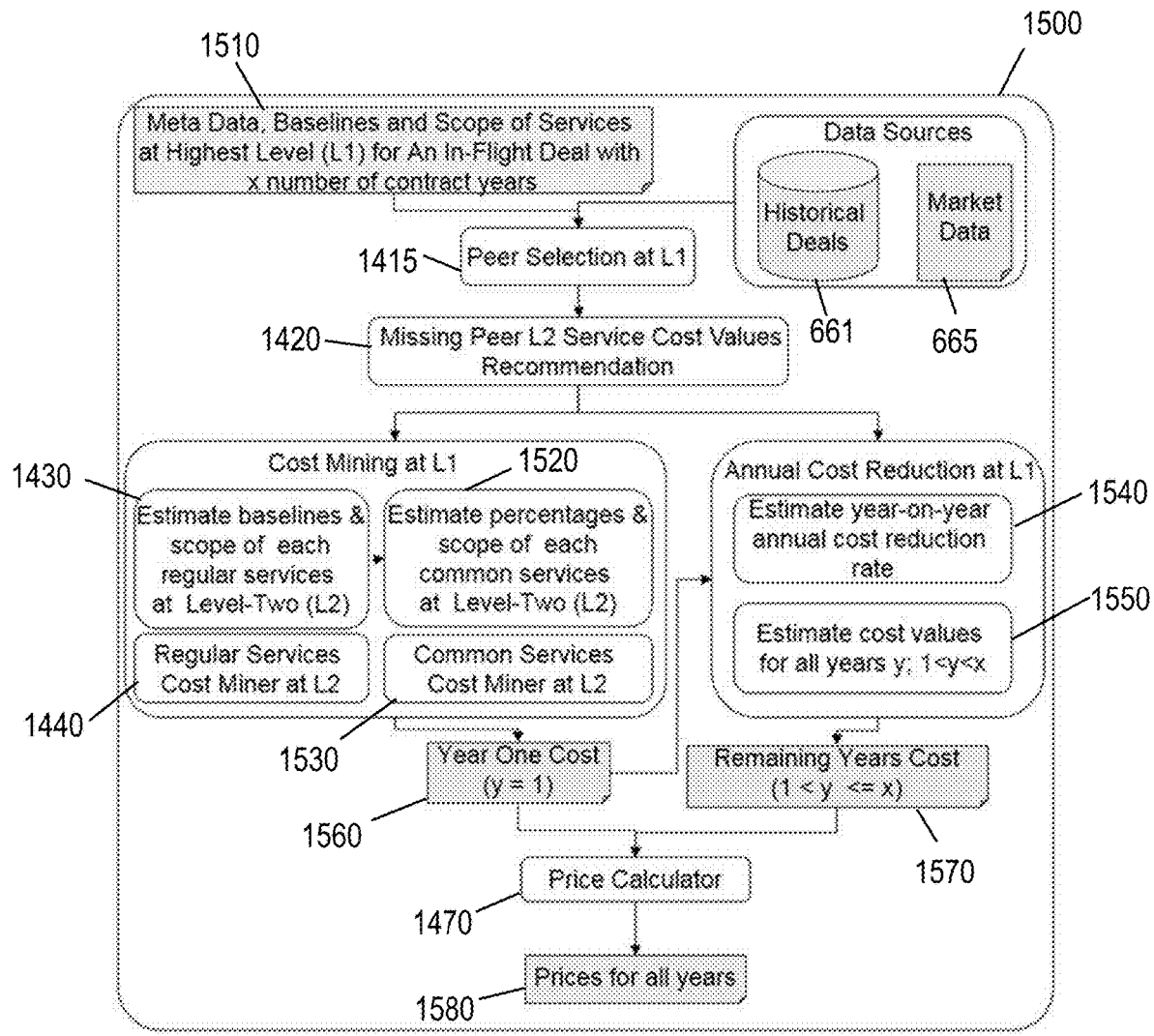
FIG. 15 illustrates an example process for estimating annual cost reduction when pricing IT services deals, in accordance with an embodiment.

FIG. 15 illustrates an example process 1500 for estimating annual cost reduction when pricing IT services deals, in accordance with an embodiment. IT services contracts typically span over several years. In order to calculate the price estimates for the whole project span, both bottom-up or top-down approaches first come up with cost/price estimates for the first year and then apply a cost/price reduction to arrive at the estimates for rest of the years in the contract term. This is because, over the years of an IT service contract, clients expect a decreasing unit costs/unit prices of services (i.e. the cost/price for a defined resource unit) as they want to benefit from the providers' hardware price performance and labor productivity gains in the services consumed. For these reasons, the costs do decrease as time goes forward. That decrease depends on both the contract year as well as the actual calendar year since the latter determines the state of the economy at large, which also affects this cost reduction rate. Thus, both should be taken in consideration when estimating these annual cost reductions.

Traditionally, solution designers specify a fixed annual unit/price reduction rate for services, which is then applied to the pricing approach onto the first year's cost/price to estimate costs/prices of rest of the years. Solution designers conventionally come up with the aforementioned rates based on their own personal judgment and experience. In addition, they also often customize rates for each service in each client's deal. Such manually inputted rates may result in inaccuracy estimates of costs/prices of services for the remaining years of a contract based on the first year's estimates. Thus, an automated analytical more accurate way of estimating the annual cost reduction could significantly enhance the accuracy of the overall deal pricing estimation.

In one embodiment, process 1500 analytically estimates the annual cost reduction of all services in an IT services deal for all years beyond the first year. One embodiment relies on mining similar historical data and then applies two different approaches on that mined data in order to determine the annual cost reduction estimates. These estimates can then be applied to the estimated cost/price of the first year in order to determine the total estimated cost/price of the deal for its whole life span. One or more embodiments significantly improve the pricing accuracy of IT service contracts.

An in-flight deal may have a contract term of more than few years, usually five or six years. In the solution proposal for an in-flight deal, solution designers need to include the services costs/prices estimation for all years of the contract term. Solution designers may use a pricing algorithm to estimate the costs/prices of services in an in-flight deal for the first year of the contract term and then apply a fixed rate of unit cost reduction to the year one cost of each service to arrive at the cost for year and so on. Solution designers conventionally rely on their personal judgment and experience to determine the rate. One or more embodiments, estimate the annual unit cost reduction cost of each service in an in-flight deal based on the selected peer deals for that service.

For process 1500, a set of deals is defined as D, which can be from either historical or market data. Let d∈D any deal from the set D. Each deal is defined with a tuple MetaInformation={Deal Outcome, Contract year, Geography, Industry, and Contract Term}. Further, for each deal, Services={Service$_1$, ..., Service$_i$, ... Service$_M$} where M refers to the cardinality of the set Services and specify the set of common services as: Common Services={Common Service$_1$, ..., Common Service$_j$, ..., Common Service$_N$}, where N is the cardinality of the set Common Services. Each Service$_i$∈Services, where i={1, ..., M} is denoted by the tuple (Baseline$_{i,y}$, Cost$_{i,y}$, Unit-cost$_{i,y}$, Price$_{i,y}$) for each year y where 1<=y<=x; x refers to contract term of the deal. Baseline$_{i,y}$ correspond to the unit/measure of the amount of Service$_i$ delivered by the IT service provider to a client for the contract year y; Cost$_{i,y}$, Unit-cost$_{i,y}$, and Price$_{i,y}$ refer to the total cost and unit cost of Service$_i$ and total price for the contract year y, respectively. For each level one service, unit cost reduction rate is defined as Unit-cost-red-rate$_{i,y,y+1}$, which correspond to the unit cost reduction rate of Service$_i$, of a deal d, from year y to year y+1. As the cost estimation is also performed for year one, at a granular level, the above notations are also specified at that level.

In one embodiment, each regular service Serivce$_i$, is decomposed into a set of level two services: L2 Services={L2Service$_1$, ..., L2Service$_a$, ..., L2Service$_P$} where a={1, ..., P}, and P is the cardinality of the set L2Services. Any L2Service$_a$ is defined with the tuple (L2Baseline$_a$, L2Cost$_a$, L2UnitCost$_a$, L2Price$_a$) where cardinality P may vary for different level one services. Similarly, each Common Service$_j$ consists of a set of level two common services L2 Common Services={L2CommonService$_1$, ..., L2Common Service$_b$, ..., L2Service$_Q$} where b={1, ..., Q}, and Q is the cardinality of the set L2CommonServices. Any L2CommonService$_b$ is denoted with the tuple (L2Percentage of Total Cost$_b$, L2Cost$_b$, L2Price$_b$) where cardinality Q may vary for different level-one common services.

Any in-flight deal is defined to be S which refers to a new deal for which a solution designer needs to estimate its target price/cost. Any in-flight deal S requires the following elements: the set of MetaInformation$_s$, the sets Service$_{s,k}$ and Common Service$_{s,l}$ at the level-one. Any Service$_{s,k}$ is defined by the tuple (Baseline$_{s,k,y}$, Cost$_{s,k,y}$, Unit-cost$_{s,k,y}$, Price$_{s,k,y}$) for the contract year y of the deal's contract term and Common Services is specified by the tuple (Percentage of Total Cost$_{s,l,y}$, Cost$_{s,l,y}$, Price$_{s,l,y}$). For in-flight deals, unit cost reduction rate is referred to as Unit-cost-redrate$_{s,y,y+1}$, which corresponds to the unit cost reduction rate of Service$_s$, of an in-flight deal S, from year y to year y+1.

Top Down Detailed Cost/Price Estimation for Year One

For estimating costs/prices of services included in in-flight deal, in one embodiment a top down detailed cost/price estimation algorithm as described above is utilized. For each service of an in-flight deal, the algorithm executes the following: selecting peer deals, calculating scope and baselines or services at level two, recommending missing service cost values at level two in peer deals, and estimating costs/prices at level two and aggregating them to compute the costs/prices at level one. The approach does not require input regarding level two requirements of an in-flight deal, from solution designers. Instead, the algorithm automatically generates the expected input at level-two from the input for the level-one services.

In one embodiment, metadata, baselines and scope of services at level one for an in-flight deal with x number of contract years (x being a positive integer) is input at block 1510. The data sources include historical deals 661 and market data 665. In one embodiment, the peer selection at block 1415 of the process 1500 has two stages: 1) select peer deals by matching metadata of an in-flight deal with that of peer deals, and 2) sorting of peer deals using a proximity criteria.

In one embodiment, to sort peers selected for each regular service Service$_{s,k}$ of an in-flight deal, process 1500 adopts a criteria based on baselines proximity, Baseline Proximity$_{d,s,k}$=|Baseline for Service$_i$ of deal d−Baseline for Service$_{s,k}$|. Baseline Proximity$_{d,s,k}$ refers to the baseline proximity between a deal d∈D and an in-flight deal S with respect to the Service$_i$ or Service$_{s,k}$ which are the same service from deal and the in-flight deal respectively. For each common service Common Service$_{s,l}$ of an in-flight deal, the pricing algorithm adopts a criteria based on different proximity defined as below.

Common Service $Proximity_{d,s,l}$ =

|Sum of Costs of regular Services for a deal $d$ −

$Sim$ of costs of regular services of S|

Common Service Proximity$_{d,s,l}$ refers to the proximity between a deal d∈D and an in-flight deal S with respect to the Common Service$_j$ or Common Service$_{s,l}$ which are the same service from deal and the in-flight deal respectively. Then, process 1500 calculates scope and baselines or services at level two for an in-flight deal, based on the level one input regarding scope and baselines.

Each Service$_{s,k}$ has a set of level two services L2 Service$_{s,k,a}$. To determine which of them are in-scope, in one embodiment a set of predefined business rules are used as default. To calculate baseline of L2Service$_{s,k,a}$, process 1500 uses the peer deal selected for the corresponding level one Service$_s$ from market benchmark data 665. In one embodiment p$_m$∈D is referred to as the market peer deal for the Service$_s$, Baseline$_{pma}$ is referred to as the baseline of the corresponding level two L2Service$_{i,a}$ of peer p$_m$, and Baseline$_{pmi}$ is referred to as the corresponding level one Service$_i$ of peer p$_m$. Then the baselines for L2Service$_{s,k,a}$ is defined as:

$$L2Baseline_{s,k,a} = \frac{L2BaseLine_{pma} * Baseline_{s,k}}{Baseline_{pmi}}$$

In one embodiment, block 1420 involves recommending missing service cost values at level two in peer deals. The above processing is required to address a specific challenge that not all level two sub services in an in-flight deal are always included in the selected peer deals. This happens because every deal may have different IT service demand hence some services may not be included in some peer deals. Missing service cost values in peer deals is a significant challenge especially costs/prices are estimated at granular levels like level two. In one embodiment, for each Service$_s$, it is assumed that there are selected peer deals P$_h$∈D where h={1, . . . , H}, and H is the number of selected peers of that particular Service$_{s,k}$. For each L2Service$_{ha}$, of the corresponding service from each peer, the cost is denoted as L2Cost$_{ha}$ which may not be available for some peers. For the peers that miss L2Cost$_{ha}$ value, process 1500 estimates cost values from the pool of selected peers P$_h$∈D using a recommender algorithm. Note that these selected peers of Service$_{s,k}$ are similar to each other in terms of a) their metadata information, and b) baseline proximity for regular services.

Once missing service cost values for peer deals are determined, in one embodiment process 1500 calculates the costs at level two for each L2Service$_{s,k,a}$ of level one Service$_{s,k}$. In one embodiment, process 1500 computes the unit cost of each level two service of each level one service included in an in-flight deal, by a) retrieving the n$^{th}$ percentile of the set of peer unit costs of that level two service (for regular services) denoted as L2 Unit–Cost$_{s,k,a}$. The cost of L2Service$_{s,k,a}$ is defined as:

$L2Cost_{s,k,a} = L2Unit-Cost_{s,k,a} * L2Baseline_{s,k,a}$

Once the costs of all level two services of a level one service is estimated, process 1500 aggregates them to compute the costs at level one with the following equation:

$$Cost_{s,k} = \sum_{a \in L2\ Services_{s,k}} L2Cost_{s,k,a}$$

In one embodiment, process 1500 computes cost values for common services at level two and level one as follows. Block 1430 and 1440 are processed as described above regarding process 1400 (FIG. 14). In block 1520, for each L2CommonService$_{s,l,b}$ of Common Service$_{s,l}$, process 1500 computes the percentage of the cost for that level two service to the overall cost of the deal in each of its sorted peer deals. Then process 1500 applies l$^{th}$ percentile to the set of the resulting percentages from peer deals to get the percentage of that common service to the total cost of the in-flight deal, which is noted as: L2P$_{s,l,b}$.

To compute the cost of L2CommonService$_{s,l,b}$, the total cost of all services in the in-flight deal is defined as:

$Sum_{s,all} = Sum_{s,com} + Sum_{s,reg}$

Sum$_{s,reg}$ refers to sum of the costs for the regular services of the in-flight deal; Sum$_{s,com}$ refers to the sum of the costs for the common services of the in-flight deal. Then the sum of costs of CommonService$_s$ is defined by where Com.Ser. Cost$_{s,l}$ refers to the cost of each CommonService$_{s,l}$:

$$Sum_{s,com} = \sum_{s \in S} Com.Ser.Cost_{s,l}$$

The cost of each CommonService$_{s,l}$ can be defined by level two common service cost as follows:

$$Com.Ser.Cost_s = \sum_{b \in L2CommonServices_{s,l}} L2\ Com\ Ser.Cost_{s,l,b}$$

Then, the sum of costs of CommonService$_{s,l}$ can be specified in terms of level two service costs:

$$Sum_{s,com} = \sum_{s \in S} \sum_{b \in L2CommonServices_{s,l}} L2\ Com\ Ser.Cost_{s,l,b}$$

For each L2CommonService$_{s,l,b}$:

$$Com.Ser.Cost_{s,l,b} = Sum_{s,all} * L2P_{s,l,b}$$

By transforming the above set of linear equations to a standard format process 1500 arrives at the following set of equations:

$(P_{s,1,1}-1)*Cost_{s,1,1}+P_{s,1,1}*Cost_{s,1,2}+\ldots+$
$\quad P_{s,1,1}*Cost_{s,1,B_1}+P_{s,1,1}*Cost_{s,2,1}+\ldots+$
$\quad P_{s,1,1}*Cost_{s,2,B_2}+P_{s,1,1}*Cost_{s,L,B_L}=-P_{s,1,1}$
$\quad *Sum_{s,reg}$ $P_{s,1,2}*Cost_{s,1,1}+(P_{s,1,2}-1)*Cost_{s,1,2}+\ldots+$
$\quad P_{s,1,2}*Cost_{s,1,B_1}+P_{s,1,2}*Cost_{s,2,1}+\ldots+$
$\quad P_{s,1,1}*Cost_{s,2,B_2}+P_{s,1,2}*Cost_{s,L,B_L}=-P_{s,1,2}$
$\quad *Sum_{s,reg}$ $P_{s,l,b}*Cost_{s,1,1}+(P_{s,1,2}-1)*Cost_{s,1,2}+\ldots+P_{s,l,b}$
$\quad *Cost_{s,l,B_1}+P_{s,l,2}*Cost_{s,2,1}+\ldots+P_{s,1,1}$
$\quad *Cost_{s,2,B_2}+(P_{s,l,b}-1)*Cost_{s,L,B_L}=-P_{s,L,B}$
$\quad *Sum_{s,reg}$ L is the cardinality of the set Common Services$_{s,l}$; B$_1$, B$_2$, ... B$_L$ are cardinalities of the sets L2Common Sevices$_1$, ..., L2Common Services$_L$. Process 1500 solves these equations straightforwardly as they fulfil the requirement for such set of linear equations. By solving the above equations, process 1500 computes the cost of each L2CommonService$_{s,l,b}$ (L2 Com.Ser.Cost$_{s,l,b}$) for the first year.

In one embodiment, by following the same sequence, process 1500 estimates costs for all level two services, and then level one services included in an in-flight deal, and then costs for the deal itself. By adding an arbitrary gross profit to the cost, process 1500 calculates prices for the individual services at level two, level one and at deal level. In one embodiment, output of process 1500 would be the Cost$_{s,y}$, Price$_{s,k}$, for each level one k and Cost$_{s,l}$, Price$_{s,l}$, for each level one CommonService$_{s,l}$ for the first year of the in-flight deal's contract term.

Unit Cost Reduction Rate Estimation

In one embodiment, blocks 1540 and 1550 estimate unit cost reduction rate for level one services in an in-flight deal. The input for blocks 1540 and 1550 are: a) the service cost value for year one calculated as described above, and b) metadata information and detailed cost structure for historical and market deals for all services level for all contract years of deals. In one example embodiment, process 1500 determines the Unit-cost-red-rate$_{s, y, y+1}$ for each Service$_s$ of an in-flight deal for multiple years, such as two consecutive years y and y+1.

In one embodiment, assume that there are selected peer deals p$_h \in$ D where h={1, ..., H}, and H is the number of selected peers of that particular Service$_i$ which correspond to the Service$_s$ of an in-flight deal. For each peer p$_h$, first process 1500 computes Unit-cost$_{i, y}$ for two consecutive years y, and y+1. From those unit cost values for two consecutive years y, and y+1, process 1500 estimates Unit-cost-red-rate$_{h, y, y+1}$, for the corresponding Service$_i$.

$$\text{Unit-cost-red-}rate_{h,i,y,y+1} = \frac{\text{Unit-}Cost_{h,i,y+1} - \text{Unit-}cost_{h,i,y}}{\text{Unit-}Cost_{h,i,y+1}}.$$

From the set of Unit-cost-red-rate$_{h, y, y+1}$, for each deal p$_h$, process 1500 determines the representative Unit-cost-red-rate$_{s, y, y+1}$, for each year y (>1). For this processing, the following methods are employed: a) fixed rate, b) percentile, c) multi variable regression. For approach (a), in all services, and for all transitions between years, process 1500 uses a fixed rate for annual cost reduction, recommended by the business subject matter experts. In approach (b), process 1500 applies a defined percentile to the set of unit cost reduction values from the selected peer deals for each service, and for each transition between years y and y+1.

For approach c), process 1500 formulates the problem as multi variable regression. The regression model is defined as follows. The general regression model takes the form of y=α+x1β$_1$+x2β$_2$+ ... +x$_m$β$_m$+ε where α=intercept; β$_1$, β$_2$, β$_m$=regression coefficients, ε is residual standard deviation. In one embodiment, the dependent variable y=Unit-cost-red-rate$_{s, y, y+1}$, because process 1500 needs to estimate the year-on-year annual cost reduction for transition between year y and y+1. Further, in one embodiment the following two independent or indicator variables are defined as: x$_1$: Baseline$_{s, y}$; x$_2$: Baseline$_{s, y+1}$. The baselines of the involving years y and y+1 are selected as indicator variables, since they are expected to drive the unit cost values for the respective years.

In one embodiment, the results from blocks 1540 and 1550 include the remaining years cost (1<y<=x), and the result from year one cost (y=1) from block 1560 are input to a price calculator at block 1470. The price calculator 1470 results in the prices for all years at block 1580.

Demonstrable Example

Assume an in-flight deal includes several level one services Service$_{s,k}$ (e.g. "Intel Images"). In addition, the in-flight deal contract starts in the year of Yr$_4$, would last for five years until Yr$_8$. For the in-flight deal, given the Service$_{s,k}$, peer selection at block 1415 retrieves a set of peer deals. The oldest deal starts as early as Yr$_1$ and latest one begins in Yr$_4$, which is same as the in-flight deal' starting year in this example. To calculate year-on-year (YonY) unit cost reduction, process 1500 selects the sample data points as follows. For example, to calculate YonY unit cost reduction from year Yr$_4$ (the first year of the in-flight deal) to year Yr$_5$ (the second year of the in-flight deal), process 1500 considers the calendar years of Yr$_4$ and Yr$_5$, and searches for samples for these two years from selected peers. The years Yr$_4$ and Yr$_5$, however, may not always be the first and second years of peer deals (e.g. peer 1' 4$^{th}$ and 5$^{th}$ years). In this example, let there be 10 samples for Yr$_4$/Yr$_5$ and 9 samples for Yr$_5$ and Yr$_6$ and so on. In other words, the calendar years considered show the historical trends of annual cost reduction rates. This is because that the annual unit cost reduction is related to the calendar year economic and market conditions.

In the cases where there are not enough sample annual unit cost reduction data points, one embodiment treats these as follows. For a percentile approach, if there are less than two data points for a level one service, process 1500 uses the fixed rate for annual cost reduction for that service. In case of a regression approach, process 1500 uses the fixed rate if there are less than three data points for a level one service.

Cost Calculation

In one embodiment, for all years y where $1<y<x$; x refers to contract term of the in-flight deal, process 1500 estimates at blocks 1540 and 1550 Unit-cost-red-rate$_{s, y, y+1}$ using either a) fixed rate, or b) percentile based rate, or c) regression based rate. From these values and Unit-cost$_{s, i, 1}$ process 1500 computes the Unit-cost$_{s, i, y}$. From the Unit-cost$_{s, i, y}$ and user input Baseline$_{s, i, y}$ process 1500 computes (Cost$_{s, i, y}$, Price$_{s, i, y}$) where $1<y<=x$.

The one or more embodiments may be a system, a method, and/or a computer program product. The computer program product may include a computer readable storage medium (or media) having computer readable program instructions thereon for causing a processor to carry out aspects of the embodiments. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to the various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that the present embodiments provides a system, computer program product, and method for implementing the embodiments. The present embodiments further provides a non-transitory computer-useable storage medium for implementing the embodiments. The non-transitory computer-useable storage medium has a computer-readable program, wherein the program upon being processed on a computer causes the computer to implement the steps of the embodiments described herein. References in the claims to an element in the singular is not intended to mean "one and only" unless explicitly so stated, but rather "one or more." All structural and functional equivalents to the elements of the above-described exemplary embodiments that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles of the embodiments and the practical application, and to enable others of ordinary skill in the art to understand the embodiments for various modifications as are suited to the particular use contemplated.

What is claimed is:

1. A method for using a processing tool including machine learning processing for estimating unit price reduction of services in a new in-flight deal using data of historical deals and market reference deals cost structures comprising:
    loading, by a peer selection engine, a detailed cost structure for historical information, market deals information, services quantity information and deals metadata for a first year from at least one storage device to the processing tool;
    filtering, by the peer selection engine, the detailed cost structure for historical information, the market deals information, the services quantity information and the deals metadata for the first year by removing peer deals having metadata values that are not a match for a set of metadata values for the new in-flight deal;
    for each first level service and each second level service in a set of services:
        filtering, by the peer selection engine, peer deals by removing peer deals that do not include a service in the set of services;
        generating a classification model;
        training the classification model on the data of historical deals using a binary classification for each service;
        determining via machine learning by the trained classification model, whether a service is in-scope for the new in-flight deal based on a set of predefined business rules;
        selecting a corresponding set of historical peer deals and corresponding market deals for each service based on particular input parameters;
        augmenting missing cost data values in the peer deals by generating recommended cost data values, wherein the missing cost data values include missing baselines for possible services, missing unit cost for regular services and unit percentages for common services;
    estimating unit cost reduction values for the peer deals;
    estimating amongst each contract year beyond a first contract year and except a last contract year, the unit cost reduction for the new in-flight deal using a trained multivariable regression model on calculated annual cost reductions;
    generating outputs for a total cost estimate for the new in-flight deal for all future years in the total contract years beyond the first year, wherein the outputs comprise cost estimates for all first level services and all second level services in the new in-flight deal, and for costs for the new in-flight deal itself, and each first level service has a set of second level services;
    receiving the outputs by a machine learning predictive analytics model;
    training, the machine learning predictive analytics model using the deals metadata; and
    determining, using the trained machine learning predictive analytics model, a probability of success for the new in-flight deal at each price point of a set of price points.

2. The method of claim 1, wherein:
augmenting of the missing cost data values is based on using a recommendation system for all peer deals for all contract years of the new in-flight deal;
the deals metadata comprises type of client, deal outcome, contract year, geography information and industry type attributes of the new in-flight deal;
the regular services comprise services having a corresponding cost independent of other services included in a same deal as a regular service; and
the common services comprise services having a corresponding cost that is dependent on one or more regular services included in the same deal as account management.

3. The method of claim 2, wherein:
the attributes comprise: client-market segmentation, geographical location of a client, industry of the client, level of deal complexity, classification for deal country proximity, delivery executive, third party advisor, contract length, number of competitors, and competitor classification.

4. The method of claim 1, wherein estimating of annual cost reductions for the peer deals is determined at all years of a contract of the new in-flight deal for peer deals that have an equal or greater number of contract years to the new in-flight deal.

5. The method of claim 1, wherein estimating annual cost reductions for the peer deals are performed only for years of a particular peer contract for peer deals that have a less number of contract years than the new in-flight deal.

6. The method of claim 1, wherein:
the processing tool outputs a full cost data structure via an output interface; and
the full cost data structure comprises one or more actual unit cost values and one or more recommended cost data values for augmenting one or more missing cost data values.

7. A system comprising a computer processor, a computer-readable hardware storage device, and program code embodied with the computer-readable hardware storage device for execution by the computer processor to implement a method for using a processing tool including machine learning processing for estimating unit price reduction of services in a new in-flight deal using data of historical deals and market reference deals cost structures, the method comprising:
loading, by a peer selection engine, a detailed cost structure for historical information, market deals information, services quantity information and deals metadata for a first year from at least one storage device to the processing tool;
filtering, by the peer selection engine, the detailed cost structure for historical information, the market deals information, the services quantity information and the deals metadata for the first year by removing peer deals having metadata values that are not a match for a set of metadata values for the new in-flight deal;
for each first level service and each second level service in a set of services:
filtering, by the peer selection engine, peer deals by removing peer deals that do not include a service in the set of services;
generating a classification model;
training the classification model on the data of historical deals using a binary classification for each service;
determining via machine learning by the trained classification model, whether a service is in-scope for the new in-flight deal based on a set of predefined business rules;
selecting a corresponding set of historical peer deals and corresponding market deals for each service based on particular input parameters;
augmenting missing cost data values in the peer deals by generating recommended cost data values, wherein the missing cost data values include missing baselines for possible services, missing unit cost for regular services and unit percentages for common services;
estimating unit cost reduction values for the peer deals;
estimating amongst each contract year beyond a first contract year and except a last contract year, the unit cost reduction for the new in-flight deal using a trained multivariable regression model on calculated annual cost reductions;
generating outputs for a total cost estimate for the new in-flight deal for all future years in the total contract years beyond the first year, wherein the outputs comprise cost estimates for all first level services and all second level services in the new in-flight deal, and for costs for the new in-flight deal itself, and each first level service has a set of second level services;
receiving the outputs by a machine learning predictive analytics model;
training, the machine learning predictive analytics model using the deals metadata; and
determining, using the trained machine learning predictive analytics model, a probability of success for the new in-flight deal at each price point of a set of price points.

8. The system of claim 7, wherein:
augmenting of the missing cost data values is based on using a recommendation system for all peer deals for all contract years of the new in-flight deal;
the deals metadata comprises type of client, deal outcome, contract year, geography information and industry type attributes of the new in-flight deal;
the regular services comprise services having a corresponding cost independent of other services included in a same deal as a regular service; and
the common services comprise services having a corresponding cost that is dependent on one or more regular services included in the same deal as account management.

9. The system of claim 8, wherein:
the attributes comprise: client-market segmentation, geographical location of a client, industry of the client, level of deal complexity, classification for deal country proximity, delivery executive, third party advisor, contract length, number of competitors, and competitor classification.

10. The system of claim 7, wherein estimating of annual cost reductions for the peer deals is determined at all years of a contract of the new in-flight deal for peer deals that have an equal or greater number of contract years to the new in-flight deal.

11. The system of claim 7, wherein estimating annual cost reductions for the peer deals are performed only for years of a particular peer contract for peer deals that have a less number of contract years than the new in-flight deal.

12. The system of claim 7, wherein:
the processing tool outputs a full cost data structure via an output interface; and
the full cost data structure comprises one or more actual unit cost values and one or more recommended cost data values for augmenting one or more missing cost data values.

13. A computer program product for used for a processing tool including machine learning processing for estimating unit price reduction of services in a new in-flight deal using data of historical deals and market reference deals cost structures, the computer program product comprising a computer readable storage medium having program instructions embodied therewith, the program instructions executable by a processor to cause the processor to:
load, by the processor, a detailed cost structure for historical information, market deals information, services quantity information and deals metadata for a first year from at least one storage device to the processing tool;
filtering, by the processor, the detailed cost structure for historical information, the market deals information, the services quantity information and the deals metadata for the first year by removing peer deals having metadata values that are not a match for a set of metadata values for the new in-flight deal;

for each first level service and each second level service in a set of services:
  filter, by the processor, peer deals by removing peer deals that do not include a service in the set of services;
  generate, by the processor, a classification model;
  train, by the processor, the classification model on the data of historical deals using a binary classification for each service;
  execute, by the processor, the trained classification model to determine via machine learning whether a service is in-scope for the new in-flight deal based on a set of predefined business rules;
  select, by the processor, a corresponding set of historical peer deals and corresponding market deals for each service based on particular input parameters;
  augment, by the processor, missing cost data values in the peer deals by generating recommended cost data values, wherein the missing cost data values include missing baselines for possible services, missing unit cost for regular services and unit percentages for common services;
  estimate, by the processor, unit cost reduction values for the peer deals;
  estimate, by the processor, amongst each contract year beyond a first contract year and except a last contract year, the unit cost reduction for the new in-flight deal using a trained multivariable regression model on calculated annual cost reductions;
  generate, by the processor, outputs for a total cost estimate for the new in-flight deal for all future years in the total contract years beyond the first year, wherein the outputs comprise cost estimates for all first level services and all second level services in the new in-flight deal, and for costs for the new in-flight deal itself, and each first level service has a set of second level services;
  receive, by the processor, the outputs by a machine learning predictive analytics model;
  train, by the processor, the machine learning predictive analytics model using the deals metadata; and
  determine, by the processor, using the trained machine learning predictive analytics model, a probability of success for the new in-flight deal at each price point of a set of price points.

14. The computer program product of claim 13, wherein:
augmenting of the missing cost data values is based on using a recommendation system for all peer deals for all contract years of the new in-flight deal;
the deals metadata comprises type of client, deal outcome, contract year, geography information and industry type attributes of the new in-flight deal;
the regular services comprise services having a corresponding cost independent of other services included in a same deal as a regular service; and
the common services comprise services having a corresponding cost that is dependent on one or more regular services included in the same deal as account management.

15. The computer program product of claim 14, wherein:
generating an estimate of annual cost reductions for the peer deals is based on a determination at all years of a contract of the new in-flight deal for peer deals that have an equal or greater number of contract years to the new in-flight deal; and
the attributes comprise: client-market segmentation, geographical location of a client, industry of the client, level of deal complexity, classification for deal country proximity, delivery executive, third party advisor, contract length, number of competitors, and competitor classification.

16. The computer program product of claim 13, wherein generating an estimate of annual cost reductions for the peer deals is performed only for years of a particular peer contract for peer deals that have a less number of contract years than the new in-flight deal.

17. The computer program product of claim 13, wherein:
the processing tool outputs a full cost data structure via an output interface; and
the full cost data structure comprises one or more actual unit cost values and one or more recommended cost data values for augmenting one or more missing cost data values.

* * * * *